(12) United States Patent
Huang et al.

(10) Patent No.: US 12,016,043 B2
(45) Date of Patent: Jun. 18, 2024

(54) DATA TRANSMISSION METHOD AND APPARATUS

(71) Applicant: HUAWEI TECHNOLOGIES CO., LTD., Shenzhen (CN)

(72) Inventors: Wenwen Huang, Shanghai (CN); Meng Hua, Shanghai (CN); Xiaolei Tie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 623 days.

(21) Appl. No.: 17/172,080

(22) Filed: Feb. 10, 2021

(65) Prior Publication Data

US 2021/0168812 A1 Jun. 3, 2021

Related U.S. Application Data

(63) Continuation of application No. PCT/CN2019/099988, filed on Aug. 9, 2019.

(30) Foreign Application Priority Data

Aug. 10, 2018 (CN) .......................... 201810911048.6
Jan. 11, 2019 (CN) .......................... 201910028357.3

(51) Int. Cl.
*H04W 72/53* (2023.01)
*H04B 7/06* (2006.01)
(Continued)

(52) U.S. Cl.
CPC .......... *H04W 72/53* (2023.01); *H04B 7/0626* (2013.01); *H04B 7/0632* (2013.01); *H04W 72/0446* (2013.01); *H04W 72/23* (2023.01)

(58) Field of Classification Search
CPC . H04W 72/53; H04W 72/0446; H04W 72/23; H04W 52/0245; H04W 52/0216;
(Continued)

(56) References Cited

U.S. PATENT DOCUMENTS

2014/0105162 A1 4/2014 Li et al.
2015/0172021 A1 6/2015 Noh et al.
(Continued)

FOREIGN PATENT DOCUMENTS

CN 102843209 A 12/2012
CN 106487474 A 3/2017
(Continued)

OTHER PUBLICATIONS

Huawei et al., "Summary of remaining issues on CSI measurement", 3GPP TSG RAN WG1 Meeting #92Bis R1-1803634,Sanya, China, Apr. 16, 20, 2018, Total 3 Pages.
(Continued)

*Primary Examiner* — Kwang B Yao
*Assistant Examiner* — Syed M Bokhari

(57) ABSTRACT

This application provides a data transmission method and an apparatus. The method includes: receiving first DCI sent by a network device, where the first DCI includes a quantity of layers for transmitting first data through a PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by a terminal device, and N1 is a positive integer; and receiving the first data sent by the network device, and demodulating the first data based on the first DCI. Therefore reducing radio frequency power consumption of the terminal device.

19 Claims, 9 Drawing Sheets

(51) Int. Cl.
*H04W 72/0446* (2023.01)
*H04W 72/23* (2023.01)

(58) Field of Classification Search
CPC ............. H04W 52/0212; H04B 7/0632; H04B 7/0626; H04B 7/0602; H04B 7/0691; H04L 5/0023; H04L 5/0044; H04L 5/006; Y02D 30/70
USPC ........................................................ 370/329
See application file for complete search history.

(56) References Cited

U.S. PATENT DOCUMENTS

| | | | |
|---|---|---|---|
| 2017/0019915 A1 | 1/2017 | Nogami et al. | |
| 2017/0126376 A1* | 5/2017 | Wang | ........................ H04L 5/006 |
| 2017/0238312 A1 | 8/2017 | Chen et al. | |
| 2018/0323934 A1* | 11/2018 | Suzuki | .................. H04L 5/0053 |
| 2018/0375627 A1* | 12/2018 | Suzuki | ..................... H04J 11/00 |

FOREIGN PATENT DOCUMENTS

| | | |
|---|---|---|
| CN | 107733483 A | 2/2018 |
| CN | 108024310 A | 5/2018 |
| CN | 108462552 A | 8/2018 |
| EP | 3780767 A1 | 2/2021 |
| EP | 3809761 A1 | 4/2021 |
| WO | 2016164246 A1 | 10/2016 |
| WO | 2018082681 A1 | 5/2018 |
| WO | 2018084971 A1 | 5/2018 |

OTHER PUBLICATIONS

R4-1806284, Intel Corporation, NR PDSCH UE demodulation requirements, 3GPP TSG-RAN WG4 Meeting #87, Busan, South Korea. May 21-25, 2018, total 7 pages.
RP-180810, vivo, Views on Rel-16 NR UE power saving, 3GPP TSG RAN Meeting #80,La Jolla, USA, Jun. 11-14, 2018, total 4 pages.
RP-181463, Catt et al., New SID: Study on UE Power Saving in NR, 3GPP TSG RAN Meetings #80, La Jolla, USA, Jun. 11-14, 2018, total 5 pages.
Chinese Office Action dated Feb. 20, 2021 for Application No. 201910028357.3, 6 pages.
PCT International Search Report for PCT/CN2019/099988 dated Aug. 9, 2019, 10 pages.
Qualcomm Incorporated, UE Adaptation to the Traffic and UE Power Consumption Characteristics, 3GPP TSG-RAN WG1 Meeting#94bis, Oct. 8-12, 2018, R1-1811282Chengdu, China, 17 pages.
European Search Report dated Aug. 24, 2021 for EP Application No. 19847169.0, 19 pages.

* cited by examiner

DATA TRANSMISSION METHOD AND APPARATUS

CROSS-REFERENCE TO RELATED APPLICATIONS

This application is a continuation of International Application No. PCT/CN2019/099988, filed on Aug. 9, 2019, which claims priority to Chinese Patent Application No. 201910028357.3, filed on Jan. 11, 2019 and claims priority to Chinese Patent Application No. 201810911048.6, filed on Aug. 10, 2018, The disclosures of the aforementioned applications are hereby incorporated by reference in their entireties.

TECHNICAL FIELD

This application relates to the field of communications technologies, and in particular, to a data transmission method and an apparatus.

BACKGROUND

In a mobile communications system, power consumption of a terminal device is an important aspect of user experience. 3GPP Release 16 proposes to optimize power consumption of a terminal device in new radio (New radio, NR). A quantity of antennas affects radio frequency power consumption of the terminal device, and more working antennas of the terminal device indicate higher radio frequency power consumption.

In NR, the terminal device reports, to a network device, a capability of a maximum quantity of layers of a physical downlink shared channel (Physical downlink shared channel, PDSCH). The maximum quantity of layers may be 2, 4, or 8. A quantity of layers of the PDSCH scheduled by the network device cannot exceed the maximum quantity of layers reported by the terminal device. The network device configures parameters of a dedicated demodulation reference signal (Dedicated demodulation reference signals, DMRS) for the terminal device by using radio resource control (Radio Resource Control, RRC) signaling. The parameters of the DMRS include parameters such as a type of the DMRS and a maximum quantity of orthogonal frequency division multiplexing (Orthogonal Frequency Division Multiplexing, OFDM) symbols of the DMRS. These parameters correspond to a group of antenna port configurations, and different parameters correspond to different antenna port configurations. In NR, there is a one-to-one correspondence between antenna ports and a quantity of layers of the PDSCH. When the network device sends data to the terminal device, the network device first indicates, to the terminal device through downlink control information (Downlink Control Information, DCI), downlink scheduling information and a value used to indicate an antenna port (a quantity of layers). A quantity of antennas used by the terminal device to receive the PDSCH needs to be greater than or equal to the quantity of layers of the PDSCH. The antenna port configuration includes a correspondence between the value and the antenna port (the quantity of layers). For example, when the value in the DCI is 10, and a quantity of the antenna ports corresponding to the value 10 is 4 (DMRS ports 0 to 3), it indicates that four layers are currently scheduled, and the terminal device needs to receive the PDSCH by using at least four receive antennas; or when the value in the DCI is 0, and a quantity of the antenna ports corresponding to the value 0 is 1 (a DMRS port 0), it indicates that one layer is currently scheduled, and the terminal device may receive the PDSCH by using only one receive antenna. In addition, the downlink scheduling information includes PDSCH time/frequency domain resource allocation information, and the time domain resource allocation information refers to a start position and a length of the scheduled PDSCH. The network device sends the DCI through a physical downlink control channel (Physical downlink control channel, PDCCH).

It can be learned from the foregoing description that the terminal device can learn of a quantity of layers of the scheduled PDSCH only after completing DCI decoding. In some scenarios, for example, during same-slot (slot) scheduling, that is, the network device sends both the PDSCH and the PDCCH to the terminal device, the terminal device needs to buffer, before completing DCI decoding, data sent by the network device through the PDSCH. The terminal device still does not determine the quantity of layers of the PDSCH scheduled by the network device, and can only buffer data according to a relatively large quantity of receive antennas. For example, a quantity of layers of the PDSCH scheduled by using the DCI is 1. However, in this case, the terminal device needs to buffer the data by using four receive antennas. However, the quantity of antennas affects radio frequency power consumption. When the terminal device simultaneously enables a plurality of receive antennas, radio frequency power consumption of the terminal device is increased.

SUMMARY

This application provides a data transmission method and an apparatus, to reduce radio frequency power consumption of a terminal device.

According to a first aspect, this application provides a data transmission method, including:

receiving first downlink control information DCI sent by a network device, where the first DCI includes a quantity of layers for transmitting first data through a physical downlink shared channel PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by a terminal device, and N1 is a positive integer; and receiving the first data sent by the network device, and demodulating the first data based on the first DCI.

According to the data transmission method provided in the first aspect, when the network device needs to send data, the network device first sends the first DCI to the terminal device. The first DCI includes the quantity of layers for transmitting the first data through the PDSCH, and under the first condition, the quantity of layers of the first data is less than or equal to N1; and under the second condition, the quantity of layers of the first data is less than or equal to N2, N1 is less than N2, and N2 is the maximum quantity of layers, for transmitting data through the PDSCH, supported by the terminal device. Therefore, when receiving the first data sent by the network device through the PDSCH, the terminal device may enable a relatively small quantity of receive antennas under the first condition, thereby reducing radio frequency power consumption of the terminal device. Under the second condition, when receiving the first data sent by the network device through the PDSCH, the terminal device may enable a relatively large quantity of receive antennas, and the receive antennas may be dynamically adjusted, thereby reducing radio frequency power consumption of the terminal device.

In a possible design, the first DCI further includes a slot offset of the first data in time.

When the quantity of layers of the first data is less than or equal to N1, the slot offset is less than a preset value.

When the quantity of layers of the first data is switched from being less than or equal to N1 to being less than or equal to N2, the slot offset is greater than or equal to the preset value.

In a possible design, under the second condition, the quantity of layers of the first data is less than or equal to N2, and after the receiving the first data sent by the network device, and demodulating the first data based on the first DCI, the method further includes:

starting a timer, and starting timing from a slot in which the first data is located.

When data sent through the PDSCH is not received in preset X slots, and the timer expires, a quantity of layers for receiving second data that is sent by the network device through the PDSCH is less than or equal to N1.

Alternatively, when third data sent by the network device through the PDSCH is received in preset X slots, the timer performs re-timing.

According to the data transmission method provided in this implementation, after the terminal device enables N2 receive antennas to receive the first data sent by the network device, the terminal device may fall back, by setting the timer, to working by using receive antennas whose quantity is less than or equal to N1, thereby reducing power consumption of the terminal device.

In a possible design, under the second condition, the quantity of layers of the first data is less than or equal to N2, and after the receiving the first data sent by the network device, and demodulating the first data based on the first DCI, the method further includes:

starting a timer, and starting timing from a position of the first DCI.

When second DCI is not received in preset X slots, and the timer expires, a quantity of layers for receiving second data that is sent by the network device through the PDSCH is less than or equal to N1.

Alternatively, when second DCI is received in preset X slots, the timer performs re-timing, where the second DCI includes a quantity of layers of third data transmitted through the PDSCH.

According to the data transmission method provided in this implementation, after the terminal device enables N2 receive antennas to receive the first data sent by the network device, the terminal device may fall back, by setting the timer, to working by using receive antennas whose quantity is less than or equal to N1, thereby reducing power consumption of the terminal device.

In a possible design, that when second data sent by the network device through the PDSCH is received in preset X slots, the timer performs re-timing includes:

If the quantity of layers of the second data is greater than a first preset quantity of layers, the timer performs re-timing; or if the quantity of layers of the second data is less than or equal to the first preset quantity of layers, the timer continues to perform timing, and when the timer expires, a quantity of layers for receiving the third data that is sent by the network device through the PDSCH is less than or equal to N1.

In a possible design, that when second DCI is received in preset X slots, the timer performs re-timing includes:

If a quantity of layers, of the second data, indicated by the second DCI is greater than a first preset quantity of layers, the timer performs re-timing; or if a quantity of layers, of the second data, indicated by the second DCI is less than or equal to the first preset quantity of layers, the timer continues to perform timing, and when the timer expires, a quantity of layers for receiving the third data that is sent by the network device through the PDSCH is less than or equal to N1.

In a possible design, under the second condition, the quantity of layers of the first data is less than or equal to N2, and after the receiving the first data sent by the network device, and demodulating the first data based on the first DCI, the method further includes:

When a quantity of times that a quantity of layers of second data is less than a second preset quantity of layers is equal to a preset threshold, a quantity of layers for receiving third data that is sent by the network device through the PDSCH is less than or equal to N1, and the preset threshold is a positive integer.

According to the data transmission method provided in this implementation, after the terminal device enables N2 receive antennas to receive the first data sent by the network device, the terminal device may fall back, by setting a counting apparatus, to working by using receive antennas whose quantity is less than or equal to N1, thereby reducing power consumption of the terminal device.

In a possible design, the quantity of layers of the first data is less than or equal to N2, and after the receiving the first data sent by the network device, and demodulating the first data based on the first DCI, the method further includes:

receiving indication information that is sent by the network device and that is used to indicate that a quantity of layers for receiving second data that is sent by the network device through the PDSCH is less than or equal to N1.

According to the data transmission method provided in this implementation, after the terminal device enables N2 receive antennas to receive the first data sent by the network device, the terminal device may fall back, by using the indication information of the network device, to working by using receive antennas whose quantity is less than or equal to N1, thereby reducing power consumption of the terminal device.

In a possible design, the method further includes:

receiving a channel state information reference signal CSI-RS sent by the network device; and calculating, based on the CSI-RS, first channel quality information CQI under the first condition and second CQI under the second condition, and sending the first CQI and/or the second CQI to the network device.

According to the data transmission method provided in this implementation, the terminal device calculates, based on the CSI-RS, the first channel quality information CQI under the first condition and the second CQI under the second condition, and sends the first CQI and/or the second CQI to the network device. Therefore, a problem that how the terminal device reports CQI to the network device when the receive antennas are dynamically adjusted in different conditions is resolved, and the network device may obtain accurate CQI, so as to determine, based on the CQI, an MCS of data sent through the PDSCH.

In a possible design, the method further includes:

When the first data sent by the network device is received in a time unit in which a CSI-RS resource is located, if a quantity of antenna ports configured in the CSI-RS resource is greater than N1, the quantity of layers of the first data is less than or equal to N2.

According to a second aspect, this application provides a data transmission method, including:

sending first downlink control information DCI to a terminal device, where the first DCI includes a quantity of layers for transmitting first data through a physical downlink shared channel PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by the terminal device, and N1 is a positive integer; and sending the first data to the terminal device.

According to the data transmission method provided in the second aspect, when a network device needs to send data, the network device first sends the first DCI to the terminal device. The first DCI includes the quantity of layers for transmitting the first data through the PDSCH, and under the first condition, the quantity of layers of the first data is less than or equal to N1; and under the second condition, the quantity of layers of the first data is less than or equal to N2, N1 is less than N2, and N2 is the maximum quantity of layers, for transmitting data through the PDSCH, supported by the terminal device. Therefore, when receiving the first data sent by the network device through the PDSCH, the terminal device may enable a relatively small quantity of receive antennas under the first condition, thereby reducing radio frequency power consumption of the terminal device. Under the second condition, when receiving the first data sent by the network device through the PDSCH, the terminal device may enable a relatively large quantity of receive antennas, and the receive antennas may be dynamically adjusted, thereby reducing radio frequency power consumption of the terminal device.

In a possible design, the first DCI further includes a slot offset of the first data in time.

When the quantity of layers of the first data is less than or equal to N1, the slot offset is less than a preset value.

When the quantity of layers of the first data is switched from being less than or equal to N1 to being less than or equal to N2, the slot offset is greater than or equal to the preset value.

In a possible design, under the second condition, the quantity of layers of the first data is less than or equal to N2, and after the sending the first data to the terminal device, the method further includes:

starting a timer, and starting timing from a slot in which the first data is located.

When data is not sent, in preset X slots, to the terminal device through the PDSCH, and the timer expires, a quantity of layers for sending second data to the terminal device through the PDSCH is less than or equal to N1.

Alternatively, when third data is sent, in preset X slots, to the terminal device through the PDSCH, the timer performs re-timing.

According to the data transmission method provided in this implementation, after the terminal device enables N2 receive antennas to receive the first data sent by the network device, the terminal device may fall back, by setting the timer, to working by using receive antennas whose quantity is less than or equal to N1, thereby reducing power consumption of the terminal device.

In a possible design, under the second condition, the quantity of layers of the first data is less than or equal to N2, and after the sending the first data to the terminal device, the method further includes:

starting a timer, and starting timing from a position of the first DCI.

When second DCI is not sent to the terminal device in preset X slots, and the timer expires, a quantity of layers for sending second data to the terminal device through the PDSCH is less than or equal to N1.

Alternatively, when second DCI is sent to the terminal device in preset X slots, the timer performs re-timing, where the second DCI includes a quantity of layers of third data transmitted through the PDSCH.

According to the data transmission method provided in this implementation, after the terminal device enables N2 receive antennas to receive the first data sent by the network device, the terminal device may fall back, by setting the timer, to working by using receive antennas whose quantity is less than or equal to N1, thereby reducing power consumption of the terminal device.

In a possible design, that when second data is sent, in preset X slots, to the terminal device through the PDSCH, the timer performs re-timing includes:

If the quantity of layers of the second data is greater than a first preset quantity of layers, the timer performs re-timing; or if the quantity of layers of the second data is less than or equal to the first preset quantity of layers, the timer continues to perform timing, and when the timer expires, a quantity of layers for sending the third data to the terminal device through the PDSCH is less than or equal to N1.

In a possible design, that when second DCI is sent to the terminal device in preset X slots, the timer performs re-timing includes:

If a quantity of layers, of the second data, indicated by the second DCI is greater than a first preset quantity of layers, the timer performs re-timing; or if a quantity of layers, of the second data, indicated by the second DCI is less than or equal to the first preset quantity of layers, the timer continues to perform timing, and when the timer expires, a quantity of layers for sending the third data to the terminal device through the PDSCH is less than or equal to N1.

In a possible design, under the second condition, the quantity of layers of the first data is less than or equal to N2, and after the sending the first data to the terminal device, the method further includes:

When a quantity of times that a quantity of layers of second data is less than a second preset quantity of layers is equal to a preset threshold, a quantity of layers for sending third data to the terminal device through the PDSCH is less than or equal to N1, and the preset threshold is a positive integer.

According to the data transmission method provided in this implementation, after the terminal device enables N2 receive antennas to receive the first data sent by the network device, the terminal device may fall back, by setting a counting apparatus, to working by using receive antennas whose quantity is less than or equal to N1, thereby reducing power consumption of the terminal device.

In a possible design, under the second condition, the quantity of layers of the first data is less than or equal to N2, and after the sending the first data to the terminal device, the method further includes:

sending, to the terminal device, indication information used to indicate that a quantity of layers for sending second data to the terminal device through the PDSCH is less than or equal to N1.

According to the data transmission method provided in this implementation, after the terminal device enables N2 receive antennas to receive the first data sent by the network device, the terminal device may fall back, by using the indication information of the network device, to working by using receive antennas whose quantity is less than or equal to N1, thereby reducing power consumption of the terminal device.

In a possible design, the method further includes:

sending a channel state information reference signal CSI-RS to the terminal device, so that the terminal device calculates, based on the CSI-RS, first channel quality information CQI under the first condition and second CQI under the second condition; and receiving the first CQI and/or the second CQI sent by the terminal device.

According to the data transmission method provided in this implementation, the terminal device calculates, based on the CSI-RS, the first channel quality information CQI under the first condition and the second CQI under the second condition, and sends the first CQI and/or the second CQI to the network device. Therefore, a problem that how the terminal device reports CQI to the network device when the receive antennas are dynamically adjusted in different conditions is resolved, and the network device may obtain accurate CQI, so as to determine, based on the CQI, an MCS of data sent through the PDSCH.

In a possible design, the method further includes:

When the first data is sent to the terminal device in a time unit in which a CSI-RS resource is located, if a quantity of antenna ports configured in the CSI-RS resource is greater than N1, the quantity of layers of the first data is less than or equal to N2.

According to a third aspect, this application provides a terminal device, including:

a first receiving module, configured to receive first downlink control information DCI sent by a network device, where the first DCI includes a quantity of layers for transmitting first data through a physical downlink shared channel PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by the terminal device, and N1 is a positive integer; and a second receiving module, configured to: receive the first data sent by the network device, and demodulate the first data based on the first DCI.

In a possible design, the first DCI further includes a slot offset of the first data in time.

When the quantity of layers of the first data is less than or equal to N1, the slot offset is less than a preset value.

When the quantity of layers of the first data is switched from being less than or equal to N1 to being less than or equal to N2, the slot offset is greater than or equal to the preset value.

In a possible design, under the second condition, the terminal device further includes:

a first timing module, configured to: after the second receiving module receives the first data sent by the network device and demodulates the first data based on the first DCI, start a timer, and start timing from a slot in which the first data is located.

When the second receiving module does not receive, in preset X slots, data sent through the PDSCH, and the timer expires, a quantity of layers of second data that is sent by the network device through the PDSCH and that is received by the second receiving module is less than or equal to N1.

Alternatively, when the second receiving module receives, in preset X slots, third data sent by the network device through the PDSCH, the first timing module enables the timer to perform re-timing.

In a possible design, under the second condition, the terminal device further includes:

a second timing module, configured to: after the second receiving module receives the first data sent by the network device and demodulates the first data based on the first DCI, start a timer, and start timing from a position of the first DCI.

When the second receiving module does not receive second DCI in preset X slots, and the timer expires, a quantity of layers of second data that is sent by the network device through the PDSCH and that is received by the second receiving module is less than or equal to N1.

Alternatively, when the second receiving module receives second DCI in preset X slots, the timer performs re-timing, where the second DCI includes a quantity of layers of third data transmitted through the PDSCH.

In a possible design, if the quantity of layers of the second data is greater than a first preset quantity of layers, the first timing module enables the timer to perform re-timing.

If the quantity of layers of the second data is less than or equal to the first preset quantity of layers, the first timing module enables the timer to continue to perform timing, and when the timer expires, a quantity of layers of the third data that is sent by the network device through the PDSCH and that is received by the second receiving module is less than or equal to N1.

In a possible design, if a quantity of layers, of the second data, indicated by the second DCI is greater than a first preset quantity of layers, the second timing module enables the timer to perform re-timing.

If a quantity of layers, of the second data, indicated by the second DCI is less than or equal to the first preset quantity of layers, the second timing module enables the timer to continue to perform timing, and when the timer expires, a quantity of layers of the third data that is sent by the network device through the PDSCH and that is received by the second receiving module is less than or equal to N1.

In a possible design, under the second condition, when a quantity of times that a quantity of layers of second data is less than a second preset quantity of layers is equal to a preset threshold, a quantity of layers of third data that is sent by the network device through the PDSCH and that is received by the second receiving module is less than or equal to N1, and the preset threshold is a positive integer.

In a possible design, under the second condition, the terminal device further includes:

a third receiving module, configured to: after the second receiving module receives the first data sent by the network device and demodulates the first data based on the first DCI, receive indication information that is sent by the network device and that is used to indicate that a quantity of layers for receiving second data that is sent by the network device through the PDSCH is less than or equal to N1.

In a possible design, the terminal device further includes:

a fourth receiving module, configured to receive a channel state information reference signal CSI-RS sent by the network device; and a processing module, configured to: calculate, based on the CSI-RS, first channel quality information CQI under the first condition and second CQI under the second condition, and send the first CQI and/or the second CQI to the network device.

In a possible design, when the first data sent by the network device is received in a time unit in which a CSI-RS resource is located, if a quantity of antenna ports configured in the CSI-RS resource is greater than N1, the quantity of layers of the first data is less than or equal to N2.

For beneficial effects of the network device provided in the fourth aspect and the possible designs of the fourth aspect, refer to the beneficial effects brought by the second aspect and the possible implementations of the second aspect. Details are not described herein again.

According to a fourth aspect, this application provides a network device, including:

a first sending module, configured to send first downlink control information DCI to a terminal device, where the first DCI includes a quantity of layers for transmitting first data through a physical downlink shared channel PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by the terminal device, and N1 is a positive integer; and a second sending module, configured to send the first data to the terminal device.

In a possible design, the first DCI further includes a slot offset of the first data in time.

When the quantity of layers of the first data is less than or equal to N1, the slot offset is less than a preset value.

When the quantity of layers of the first data is switched from being less than or equal to N1 to being less than or equal to N2, the slot offset is greater than or equal to the preset value.

In a possible design, under the second condition, the network device further includes:

a first timing module, configured to: after the second sending module sends the first data to the terminal device, start a timer, and start timing from a slot in which the first data is located.

When the second sending module does not send, in preset X slots, data to the terminal device through the PDSCH, and the timer expires, a quantity of layers of second data that is sent by the second sending module to the terminal device through the PDSCH is less than or equal to N1.

Alternatively, when the second sending module sends, in preset X slots, third data to the terminal device through the PDSCH, the first timing module enables the timer to perform re-timing.

In a possible design, under the second condition, the network device further includes:

a second timing module, configured to: after the second sending module sends the first data to the terminal device, start a timer, and start timing from a position of the first DCI.

When the second sending module does not send second DCI to the terminal device in preset X slots, and the timer expires, a quantity of layers of second data that is sent by the second sending module to the terminal device through the PDSCH is less than or equal to N1.

Alternatively, when the second sending module sends second DCI to the terminal device in preset X slots, the second timing module enables the timer to perform re-timing, where the second DCI includes a quantity of layers of third data transmitted through the PDSCH.

In a possible design, if the quantity of layers of the second data is greater than a first preset quantity of layers, the first timing module enables the timer to perform re-timing.

If the quantity of layers of the second data is less than or equal to the first preset quantity of layers, the first timing module enables the timer to continue to perform timing, and when the timer expires, a quantity of layers of the third data that is sent by the second sending module to the terminal device through the PDSCH is less than or equal to N1.

In a possible design, if a quantity of layers, of the second data, indicated by the second DCI is greater than a first preset quantity of layers, the second timing module enables the timer to perform re-timing.

If a quantity of layers, of the second data, indicated by the second DCI is less than or equal to the first preset quantity of layers, the second timing module enables the timer to continue to perform timing, and when the timer expires, a quantity of layers of the third data that is sent by the second sending module to the terminal device through the PDSCH is less than or equal to N1.

In a possible design, under the second condition, when a quantity of times that a quantity of layers of second data is less than a second preset quantity of layers is equal to a preset threshold, a quantity of layers of third data that is sent by the second sending module to the terminal device through the PDSCH is less than or equal to N1, and the preset threshold is a positive integer.

In a possible design, under the second condition, the network device further includes:

a third sending module, configured to: after the second sending module sends the first data to the terminal device, send, to the terminal device, indication information used to indicate that a quantity of layers for sending second data to the terminal device through the PDSCH is less than or equal to N1.

In a possible design, the network device further includes:

a fourth sending module, configured to send a channel state information reference signal CSI-RS to the terminal device, so that the terminal device calculates, based on the CSI-RS, first channel quality information CQI under the first condition and second CQI under the second condition; and a receiving module, configured to receive the first CQI and/or the second CQI sent by the terminal device.

In a possible design, when the first data is sent to the terminal device in a time unit in which a CSI-RS resource is located, if a quantity of antenna ports configured in the CSI-RS resource is greater than N1, the quantity of layers of the first data is less than or equal to N2.

For beneficial effects of the network device provided in the fourth aspect and the possible designs of the fourth aspect, refer to the beneficial effects brought by the second aspect and the possible implementations of the second aspect. Details are not described herein again.

According to a fifth aspect, this application provides a data transmission method, including:

obtaining a maximum quantity of layers of a physical downlink shared channel PDSCH on a carrier or in a bandwidth part BWP;

receiving downlink control information DCI sent by a network device, where the DCI includes a quantity of layers for sending data through the PDSCH; and receiving, on a target carrier or in a target BWP, the data sent by the network device through the PDSCH, and demodulating the data based on the DCI, where a quantity of layers of the data is less than or equal to a maximum quantity of layers of a PDSCH on the target carrier or in the target BWP.

According to the data transmission method provided in the fifth aspect, a maximum quantity of layers of a PDSCH is configured for each carrier or carrier group, or a maximum quantity of layers of a PDSCH is configured for each BWP or BWP group. Therefore, when receiving, on a corresponding carrier or in a corresponding BWP, data sent through the PDSCH, a terminal device may enable a corresponding quantity of receive antennas based on a configured maximum quantity of layers of a PDSCH. When data sent through the PDSCH is received on some carriers or in some BWPs, a relatively small quantity of receive antennas may be enabled, so that radio frequency power consumption of the terminal device can be reduced.

In a possible design, the obtaining a maximum quantity of layers of a physical downlink shared channel PDSCH on a carrier or in a bandwidth part BWP includes:

obtaining carrier configuration information or BWP configuration information, where the carrier configuration information includes a maximum quantity of layers of a PDSCH of each carrier, or the carrier configuration information includes at least one maximum quantity of layers of a PDSCH, and one maximum quantity of layers of a PDSCH is used to indicate a maximum quantity of layers of a PDSCH of one group of carriers; and the BWP configuration information includes a maximum quantity of layers of a PDSCH in each BWP, or the BWP configuration information includes at least one maximum quantity of layers of a PDSCH, and one maximum quantity of layers of a PDSCH is used to indicate a maximum quantity of layers of a PDSCH in one group of BWPs; and obtaining the maximum quantity of layers of the PDSCH of each carrier based on the carrier configuration information, or obtaining the maximum quantity of layers of the PDSCH in each BWP based on the BWP configuration information.

According to a sixth aspect, this application provides a data transmission method, including:

configuring, for a terminal device, a maximum quantity of layers of a physical downlink shared channel PDSCH on a carrier or in a bandwidth part BWP;

sending downlink control information DCI to the terminal device, where the DCI includes a quantity of layers for sending data through the PDSCH; and sending data to the terminal device on a target carrier or in a target BWP through the PDSCH, where a quantity of layers of the data is less than or equal to a maximum quantity of layers of a PDSCH on the target carrier or in the target BWP.

According to the data transmission method provided in the sixth aspect, a maximum quantity of layers of a PDSCH is configured for each carrier or carrier group, or a maximum quantity of layers of a PDSCH is configured for each BWP or BWP group. Therefore, when receiving, on a corresponding carrier or in a corresponding BWP, data sent through the PDSCH, the terminal device may enable a corresponding quantity of receive antennas based on a configured maximum quantity of layers of a PDSCH. When data sent through the PDSCH is received on some carriers or in some BWPs, a relatively small quantity of receive antennas may be enabled, so that radio frequency power consumption of the terminal device can be reduced.

In a possible design, the configuring, for a terminal device, a maximum quantity of layers of a physical downlink shared channel PDSCH on a carrier or in a bandwidth part BWP includes:

configuring, for the terminal device, the maximum quantity of layers of the PDSCH on the carrier or the BWP through carrier configuration information or BWP configuration information, where the carrier configuration information includes a maximum quantity of layers of a PDSCH of each carrier, or the carrier configuration information includes at least one maximum quantity of layers of a PDSCH, and one maximum quantity of layers of a PDSCH is used to indicate a maximum quantity of layers of a PDSCH of one group of carriers; and the BWP configuration information includes a maximum quantity of layers of a PDSCH in each BWP, or the BWP configuration information includes at least one maximum quantity of layers of a PDSCH, and one maximum quantity of layers of a PDSCH is used to indicate a maximum quantity of layers of a PDSCH in one group of BWPs.

According to a seventh aspect, this application provides a terminal device, including:

an obtaining module, configured to obtain a maximum quantity of layers of a physical downlink shared channel PDSCH on a carrier or in a bandwidth part BWP;

a first receiving module, configured to receive downlink control information DCI sent by a network device, where the DCI includes a quantity of layers for sending data through the PDSCH; and a second receiving module, configured to: receive, on a target carrier or in a target BWP, the data sent by the network device through the PDSCH, and demodulate the data based on the DCI, where a quantity of layers of the data is less than or equal to a maximum quantity of layers of a PDSCH on the target carrier or in the target BWP.

In a possible design, the obtaining module is configured to:

obtain carrier configuration information or BWP configuration information, where the carrier configuration information includes a maximum quantity of layers of a PDSCH of each carrier, or the carrier configuration information includes at least one maximum quantity of layers of a PDSCH, and one maximum quantity of layers of a PDSCH is used to indicate a maximum quantity of layers of a PDSCH of one group of carriers; and the BWP configuration information includes a maximum quantity of layers of a PDSCH in each BWP, or the BWP configuration information includes at least one maximum quantity of layers of a PDSCH, and one maximum quantity of layers of a PDSCH is used to indicate a maximum quantity of layers of a PDSCH in one group of BWPs; and obtain the maximum quantity of layers of the PDSCH of each carrier based on the carrier configuration information, or obtain the maximum quantity of layers of the PDSCH in each BWP based on the BWP configuration information.

For beneficial effects of the network device provided in the seventh aspect and the possible designs of the seventh aspect, refer to the beneficial effects brought by the fifth aspect and the possible implementations of the fifth aspect. Details are not described herein again.

According to an eighth aspect, this application provides a network device, including:

a configuration module, configured to configure, for a terminal device, a maximum quantity of layers of a physical downlink shared channel PDSCH on a carrier or in a bandwidth part BWP;

a first sending module, configured to send downlink control information DCI to the terminal device, where the DCI includes a quantity of layers for sending data through the PDSCH; and a second sending module, configured to send data to the terminal device on a target carrier or in a target BWP through the PDSCH, where a quantity of layers of the data is less than or equal to a maximum quantity of layers of a PDSCH on the target carrier or in the target BWP.

In a possible design, the configuration module is configured to:

configure, for the terminal device, the maximum quantity of layers of the PDSCH on the carrier or the BWP through carrier configuration information or BWP configuration information, where the carrier configuration information includes a maximum quantity of layers of a PDSCH of each carrier, or the carrier configuration information includes at least one maximum quantity of layers of a PDSCH, and one maximum quantity of layers of a PDSCH is used to indicate a maximum quantity of layers of a PDSCH of one group of carriers; and the BWP configuration information includes a maximum quantity of layers of a PDSCH in each BWP, or the BWP configuration information includes at least one maximum quantity of layers of a PDSCH, and one maximum quantity of layers of a PDSCH is used to indicate a maximum quantity of layers of a PDSCH in one group of BWPs.

For beneficial effects of the network device provided in the eighth aspect and the possible designs of the eighth aspect, refer to the beneficial effects brought by the sixth aspect and the possible implementations of the sixth aspect. Details are not described herein again.

According to a ninth aspect, this application provides a terminal device, including a memory and a processor.

The memory is configured to store a program instruction.

The processor is configured to invoke the program instruction in the memory, to perform the data transmission method in any one of the first aspect or the possible designs of the first aspect or any one of the fifth aspect or the possible designs of the fifth aspect.

According to a tenth aspect, this application provides a network device, including a memory and a processor.

The memory is configured to store a program instruction.

The processor is configured to invoke the program instruction in the memory, to perform the data transmission method in any one of the second aspect or the possible designs of the second aspect or any one of the sixth aspect or the possible designs of the sixth aspect.

According to an eleventh aspect, this application provides a readable storage medium. The readable storage medium stores an execution instruction, and when at least one processor of a terminal device executes the execution instruction, the terminal device performs the data transmission method in any one of the first aspect or the possible designs of the first aspect or any one of the fifth aspect or the possible designs of the fifth aspect.

According to a twelfth aspect, this application provides a readable storage medium. The readable storage medium stores an execution instruction, and when at least one processor of a network device executes the execution instruction, the network device performs the data transmission method in any one of the second aspect or the possible designs of the second aspect or any one of the sixth aspect or the possible designs of the sixth aspect.

According to a thirteenth aspect, this application provides a program product. The program product includes an execution instruction, and the execution instruction is stored in a readable storage medium. At least one processor of a terminal device may read the execution instruction from the readable storage medium, and the at least one processor executes the execution instruction, so that the terminal device implements the data transmission method in any one of the first aspect or the possible designs of the first aspect or any one of the fifth aspect or the possible designs of the fifth aspect.

According to a fourteenth aspect, this application provides a program product. The program product includes an execution instruction, and the execution instruction is stored in a readable storage medium. At least one processor of a network device may read the execution instruction from the readable storage medium, and the at least one processor executes the execution instruction, so that the network device implements the data transmission method in any one of the second aspect or the possible designs of the second aspect or any one of the sixth aspect or the possible designs of the sixth aspect.

According to a fifteenth aspect, this application provides a chip. The chip stores a computer program, and when the computer program is executed by the chip, the method in any one of the first aspect, the second aspect, the fifth aspect, and the sixth aspect, or the possible implementations of the first aspect, the second aspect, the fifth aspect, and the sixth aspect is implemented.

DESCRIPTION OF EMBODIMENTS

The embodiments of this application may be applied to a wireless communications system. It should be noted that the wireless communications system in the embodiments of this application includes but is not limited to: a narrowband internet of things (Narrow Band-Internet of Things, NB-IoT) system, a global system for mobile communications (Global System for Mobile Communications, GSM), an enhanced data rate for GSM evolution (Enhanced Data rate for GSM Evolution, EDGE) system, a wideband code division multiple access (Wideband Code Division Multiple Access, WCDMA) system, a code division multiple access 2000 (Code Division Multiple Access, CDMA2000) system, a time division-synchronous code division multiple access (Time Division-Synchronization Code Division Multiple Access, TD-SCDMA) system, a long term evolution (Long Term Evolution, LTE) system, and a fifth-generation mobile communications (the 5th Generation mobile communication technology, 5G) system.

Figure 1:
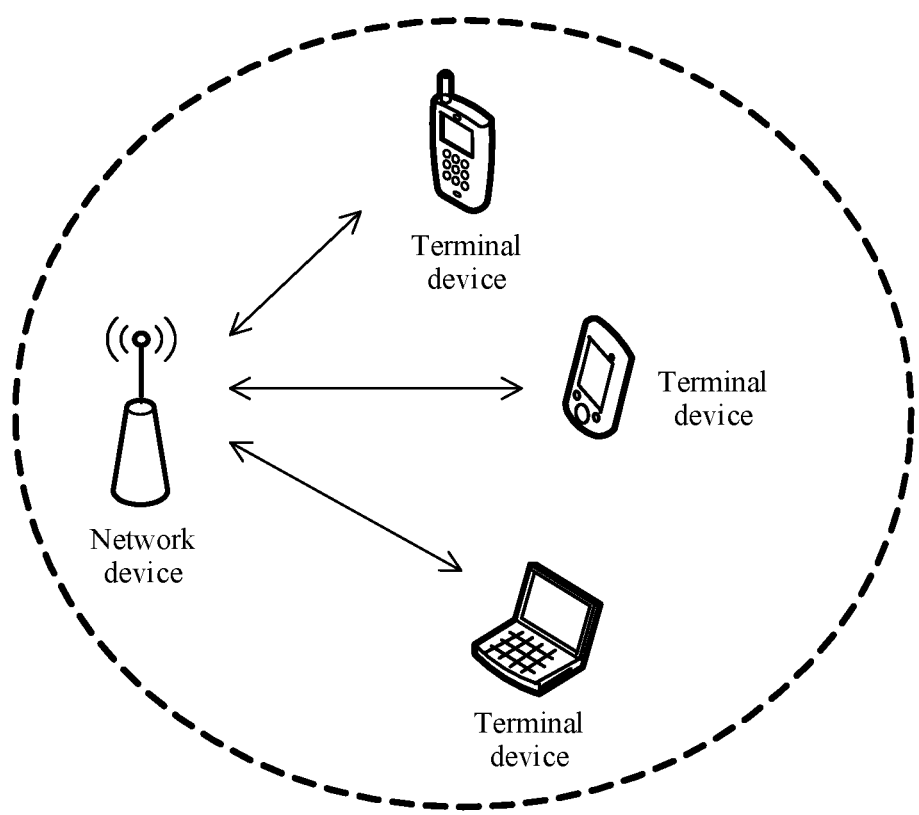
FIG. 1 is a schematic architectural diagram of a communications system.

FIG. 1 is a schematic architectural diagram of a communications system. As shown in FIG. 1, the communications system in this application may include a network device and a terminal device. The network device communicates with the terminal device. A communications apparatus related to this application is mainly a network device or a terminal device.

The network device may be a base station, an access point, an access network device, or a device that is in an access network and that communicates with a wireless terminal through one or more sectors on an air interface. The network device may be configured to: mutually convert a received over-the-air frame and an IP packet, and serve as a router between the wireless terminal and a rest portion of the access network, where the rest portion of the access network may include an Internet protocol (IP) network. The network device may further coordinate attribute management of the air interface. For example, the network device may be a base transceiver station (Base Transceiver Station, BTS) in a global system for mobile communications (Global System of Mobile communication, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (Evolutional NodeB, eNB or eNodeB) in long term evolution (Long Term Evolution, LTE), a relay node or an access point, or a base station in a future 5G network, for example, a gNB. This is not limited herein.

The terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a radio access network. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (Personal Communication Service, PCS) phone, a cordless telephone set, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), a user device (User Device or User Equipment). This is not limited herein.

In the prior art, during same-slot (slot) scheduling, a terminal device needs to buffer, before completing DCI decoding, data sent by a network device through a PDSCH. The terminal device does not determine a quantity of layers of the PDSCH scheduled by the network device, and can only buffer data according to a relatively large quantity of receive antennas. Consequently, radio frequency power consumption of the terminal device is increased. To resolve this problem, this application provides a data transmission method and an apparatus, and receive antennas are dynamically adjusted, so that a relatively small quantity of receive antennas can be enabled under a first condition, thereby reducing radio frequency power consumption of the terminal device. The following describes technical solutions of this application in detail with reference to the accompanying drawings.

Figure 2:
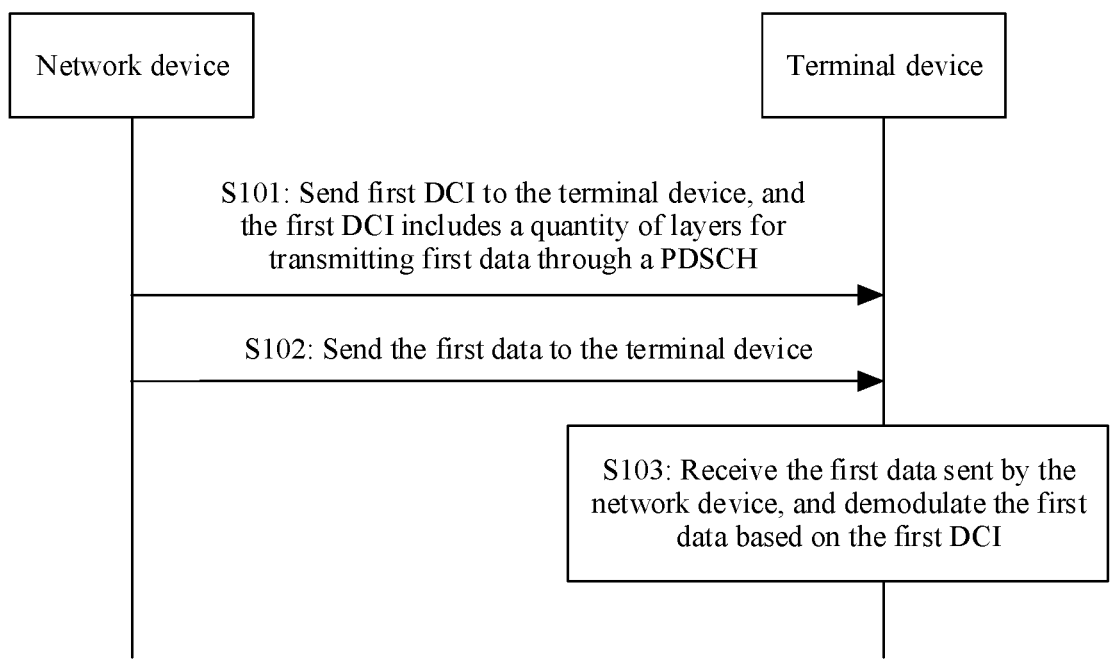
FIG. 2 is an interaction flowchart of an embodiment of a data transmission method according to this application.

FIG. 2 is an interaction flowchart of an embodiment of a data transmission method according to this application. In this embodiment, interaction between a terminal device and a network device is used as an example for description. As shown in FIG. 2, the method in this embodiment may include the following steps.

S101: The network device sends first DCI to the terminal device, where the first DCI includes a quantity of layers for transmitting first data through a PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by the terminal device, and N1 is a positive integer.

Specifically, when the network device needs to send data, the network device first sends the first DCI to the terminal device through a PDCCH. The first DCI includes the quantity of layers for transmitting the first data through the PDSCH, and the first DCI further includes PDSCH time domain resource allocation information. The PDSCH time domain resource allocation information includes a slot offset of the first data in time, a start symbol S of the PDSCH, and a length L of the PDSCH, and the slot offset and the start symbol reflect a scheduling latency. In this embodiment, values of quantities of layers of the first data are different in two different conditions. Under the first condition, the quantity of layers of the first data is less than or equal to N1. Under the second condition, the quantity of layers of the first data is less than or equal to N2, N1 is less than N2, and N2 is the maximum quantity of layers, for transmitting data through the PDSCH, supported by the terminal device. N1 may be a preset value or a value configured by the network device. Optionally, N1 is equal to a quantity of antennas used by the terminal device to receive DCI sent through the PDCCH.

Correspondingly, the terminal device receives the first DCI sent by the network device.

S102: The network device sends the first data to the terminal device.

S103: The terminal device receives the first data sent by the network device, and demodulates the first data based on the first DCI.

Specifically, when the terminal device receives the first data sent through the PDSCH, a quantity of antennas needs to be greater than or equal to the quantity of layers of the first data. In this embodiment, values of quantities of layers of the first data are different in two different conditions. Under the first condition, the quantity of layers of the first data is less than or equal to N1, N1 is less than N2, and N2 is the maximum quantity of layers, for transmitting data through the PDSCH, supported by the terminal device. In this case, the quantity of antennas used when the terminal device receives the first data may not exceed N1. In this way, the terminal device may disable other receive antennas, thereby reducing radio frequency power consumption of the terminal device. Therefore, the terminal device is in a low-power consumption and low-throughput state. Under the second condition, the quantity of layers of the first data is less than or equal to N2, so that the quantity of antennas used by the terminal device to receive the first data may be N2, and the terminal device enters a high-throughput and high-power consumption state.

In this embodiment, optionally, the first DCI further includes a slot offset of the first data in time, where when the quantity of layers of the first data is less than or equal to N1, the slot offset is less than the preset value; and when the quantity of layers of the first data is switched from being less than or equal to N1 to being less than or equal to N2, the slot offset is greater than or equal to the preset value. For example, the preset value is 1. When the quantity of layers of the first data is less than or equal to N1, the slot offset is less than 1; and when the quantity of layers of the first data is switched from being less than or equal to N1 to being less than or equal to N2, the slot offset is greater than or equal to 1. Specifically, during same-slot scheduling, the slot offset is 0; and during cross-slot scheduling, the slot offset is greater than 0.

In this embodiment, the first condition may be any one of the following conditions: same-slot scheduling, a scheduling latency being less than a preset value, channel quality or a signal-to-noise ratio being less than a preset value, relatively poor coverage, DCI not including scheduling information (for example, the DCI does not include downlink scheduling information), or the like.

The second condition may be any one of the following conditions: cross-slot scheduling, a scheduling latency being greater than a preset value, channel quality or a signal-to-noise ratio being greater than a preset value, relatively good coverage, DCI including scheduling information (for example, the DCI includes downlink scheduling information), or the like.

Same-slot scheduling and cross-slot scheduling are used as an example below. Under the first condition, for example, during same-slot scheduling, a time point at which the network device sends the first data to the terminal device through the PDSCH and a time point at which the network device sends the first DCI to the terminal device are in a same slot. The terminal device needs to buffer, before completing DCI decoding, the first data sent by the network device through the PDSCH, and the terminal device does not determine the quantity of layers of the first data scheduled by the network device. In this case, the quantity of layers of the first data is less than or equal to N1, and N1 is less than N2, so that the quantity of antennas used by the terminal device to receive the first data is less than the maximum quantity N2 of layers, for transmitting data through the PDSCH, supported by the terminal device. The terminal device does not need to simultaneously enable N2 receive antennas to receive the first data, thereby reducing radio frequency power consumption of the terminal device. In this case, the terminal device is in a low-power consumption state. Therefore, when a transmission rate is relatively low, the terminal device may disable a part of receive antennas, and only needs to enable a relatively small quantity of receive antennas to receive data transmitted through the PDSCH, thereby reducing radio frequency power consumption of the terminal device.

If the network device expects to switch from the first condition to the second condition, that is, the network device needs to schedule layers whose quantity exceeds N1, a time required by the terminal device to enable the receive antennas needs to be considered for a scheduling latency. Therefore, cross-slot scheduling is used, in other words, the time point at which the network device sends the first data to the terminal device through the PDSCH and the time point at which the network device sends the first DCI to the terminal device are not in a same slot. Under the second condition, in this case, the quantity of layers of the first data is less than or equal to N2, so that the quantity of antennas used by the terminal device to receive the first data may be N2, and the terminal device enters the high-throughput and high-power consumption state.

In an embodiment of this application, the network device does not send scheduled DCI, that is, the network device does not send DCI or DCI sent by the network device does not include the downlink scheduling information, and the terminal device is under the first condition. In this case, the terminal device receives and detects the PDCCH by using N1 receive antennas, and does not need to simultaneously enable N2 receive antennas, thereby reducing radio frequency power consumption of the terminal device. In this case, the terminal device is in the low-power consumption state. When the terminal device detects DCI including the downlink scheduling information, the terminal device switches to the second condition, that is, enables N2 receive antennas to receive the PDSCH. Before the terminal device falls back to the first condition, the terminal device may receive and detect the PDCCH by using the N2 receive antennas.

In this embodiment, under the second condition, the quantity of layers of the first data is less than or equal to N2, the terminal device enables N2 receive antennas to receive the first data from the network device, and the network device may not always have data to send. To reduce power consumption of the terminal device, the terminal device may fall back to working by using receive antennas whose quantity is less than or equal to N1. In this case, the method in this embodiment may be implemented in the following four manners:

In a first implementable manner, under the second condition, when the quantity of layers of the first data is less than or equal to N2, after S103, the method in this embodiment may further include the following steps.

S104: The terminal device starts a timer, and starts timing from a slot in which the first data is located, where when the terminal device does not receive, in preset X slots, data sent by the network device through the PDSCH, and the timer expires, a quantity of layers for receiving second data that is sent by the network device through the PDSCH is less than or equal to N1, that is, the terminal device falls back to the low-power consumption state. X may be a preset value or a value configured by the network device, and a unit of X may alternatively be another slot unit.

In addition, the network device also needs to schedule the PDSCH according to low power consumption. To be specific, the network device starts timing from the slot in which the first data is located, and when the network device does not send, in the preset X slots, the data to the terminal device through the PDSCH, the quantity of layers for sending the second data to the terminal device through the PDSCH is less than or equal to N1.

S105: When the terminal device receives, in the preset X slots, the second data sent by the network device through the PDSCH, the timer performs re-timing. In addition, when the network device sends, in the preset X slots, the second data to the terminal device through the PDSCH, the timer performs re-timing. To be specific, if scheduling occurs in the X slots, the timer performs re-timing, and both the terminal device and the network device perform re-timing.

One scheduling occurs in the X slots may be one burst data. To reduce power consumption, the terminal device needs to enter the low-power consumption state as soon as possible. In this case, further, if the quantity of layers of the second data is greater than a first preset quantity of layers, the timer performs re-timing, for example, when the first preset quantity of layers is equal to N1, where the first preset quantity of layers is limited herein by using an example. To be specific, the timer of the terminal device and the timer of the network device perform re-timing only when there is scheduling in a period in which the timer is started and a quantity of scheduled layers of data is greater than the first preset quantity of layers. Otherwise, the timer continues to perform re-timing.

If the quantity of layers of the second data is less than or equal to a first preset quantity of layers, the timer continues to perform timing, and when the timer expires, a quantity of layers for receiving third data that is sent by the network device through the PDSCH is less than or equal to N1. In other words, when the timer expires, the terminal device falls back to the low-power consumption state. In addition, the network device also needs to schedule the PDSCH according to low power consumption. In other words, the quantity of layers for sending the third data by the network device to the terminal device through the PDSCH is less than or equal to N1.

In a second implementable manner, under the second condition, when the quantity of layers of the first data is less than or equal to N2, after S103, the method in this embodiment may further include the following steps.

S104': The terminal device starts a timer, and starts timing from a slot in which the first DCI is located, where when the terminal device does not receive second DCI in preset X slot, and the timer expires, a quantity of layers for receiving second data that is sent by the network device through the PDSCH is less than or equal to N1, that is, the terminal device falls back to the low-power consumption state.

In addition, the network device also needs to schedule the PDSCH according to low power consumption. To be specific, the network device starts timing from a slot in which the first data is located, and when the network device does not send the second DCI to the terminal device in the preset X slots, the quantity of layers for sending the second data to the terminal device through the PDSCH is less than or equal to N1.

S105': When the terminal device receives second DCI in preset X slots, the timer performs re-timing, where the second DCI includes the quantity of layers of the second data transmitted through the PDSCH. In addition, when the network device sends the second DCI to the terminal device in the preset X slots, the timer performs re-timing. To be specific, if scheduling occurs in the X slots, the timer performs re-timing, and both the terminal device and the network device perform re-timing.

One scheduling occurs in the X slots may be one burst data. To reduce power consumption, the terminal device needs to enter the low-power consumption state as soon as possible. In this case, further, if the quantity of layers, of the second data, indicated by the second DCI is greater than a first preset quantity of layers, the timer performs re-timing, for example, when the first preset quantity of layers is equal to N1, where the first preset quantity of layers is limited herein by using an example. To be specific, the timer of the terminal device and the timer of the network device perform re-timing only when there is scheduling in a period in which the timer is started and a quantity of scheduled layers of data is greater than the first preset quantity of layers. Otherwise, the timer continues to perform re-timing.

If the quantity of layers, of the second data, indicated by the second DCI is less than or equal to a first preset quantity of layers, the timer continues to perform timing, and when the timer expires, a quantity of layers for receiving third data that is sent by the network device through the PDSCH is less than or equal to N1. In other words, when the timer expires, the terminal device falls back to the low-power consumption state. In addition, the network device also needs to schedule the PDSCH according to low power consumption. In other words, the quantity of layers for sending the third data by the network device to the terminal device through the PDSCH is less than or equal to N1.

In a third implementable manner, under the second condition, when the quantity of layers of the first data is less than or equal to N2, after S103, the method in this embodiment may further include the following steps.

When a quantity of times that a quantity of layers of second data is less than a second preset quantity of layers is equal to a preset threshold, a quantity of layers for receiving third data that is sent by the network device through the PDSCH is less than or equal to N1, and the terminal device falls back to the low-power consumption state, where the preset threshold is a positive integer. In addition, the network device also needs to schedule the PDSCH according to low power consumption. When the quantity of times that the quantity of layers of the second data is less than the second preset quantity of layers is equal to the preset threshold, a quantity of layers for sending the third data to the terminal device through the PDSCH is less than or equal to N1. For example, a counter may be set for the terminal device and the network device, and a size of the counter is 5, in other words, the preset threshold is 5. After the network device schedules the PDSCH and the terminal device enables N2 receive antennas to receive data, the network device still has data to be sent to the terminal device, and when a quantity of layers, for transmitting data through the PDSCH, included in the DCI is less than the second preset quantity of layers, the counter is decreased by 1, for example, when the second preset quantity of layers is equal to N1, where the second preset quantity of layers is limited herein by using an example. When the counter is equal to 0, the terminal device falls back to the low-power consumption state, and the network device also needs to schedule the PDSCH according to low power consumption.

In a fourth implementable manner, under the second condition, when the quantity of layers of the first data is less than or equal to N2, after S103, the method in this embodiment may further include the following steps.

The network device sends, to the terminal device, indication information used to indicate that a quantity of layers for sending second data to the terminal device through the PDSCH is less than or equal to N1. To be specific, the network device indicates, by sending the indication information, the terminal device to fall back to the low-power consumption state, and may explicitly or implicitly indicate a time point for falling back to the low-power consumption state. Optionally, the indication information may be sent by using RRC signaling, a MAC CE, or DCI.

According to the data transmission method provided in this embodiment, when the network device needs to send data, the network device first sends the first DCI to the terminal device. The first DCI includes the quantity of layers for transmitting the first data through the PDSCH, and under the first condition, the quantity of layers of the first data is less than or equal to N1; and under the second condition, the quantity of layers of the first data is less than or equal to N2, N1 is less than N2, and N2 is the maximum quantity of layers, for transmitting data through the PDSCH, supported by the terminal device. Therefore, when receiving the first data sent by the network device through the PDSCH, the terminal device may enable a relatively small quantity of receive antennas under the first condition, thereby reducing radio frequency power consumption of the terminal device. Under the second condition, when receiving the first data sent by the network device through the PDSCH, the terminal device may enable a relatively large quantity of receive antennas, and the receive antennas may be dynamically adjusted, thereby reducing radio frequency power consumption of the terminal device.

In the foregoing embodiment, because quantities of receive antennas that are enabled by the terminal device in different conditions are different, and different quantities of receive antennas correspond to different channel quality. The following describes in detail, with reference to FIG. 3, how the terminal device reports the CQI (Channel quality information, CQI) to the network device when the receive antennas are dynamically adjusted in different conditions.

Figure 3:
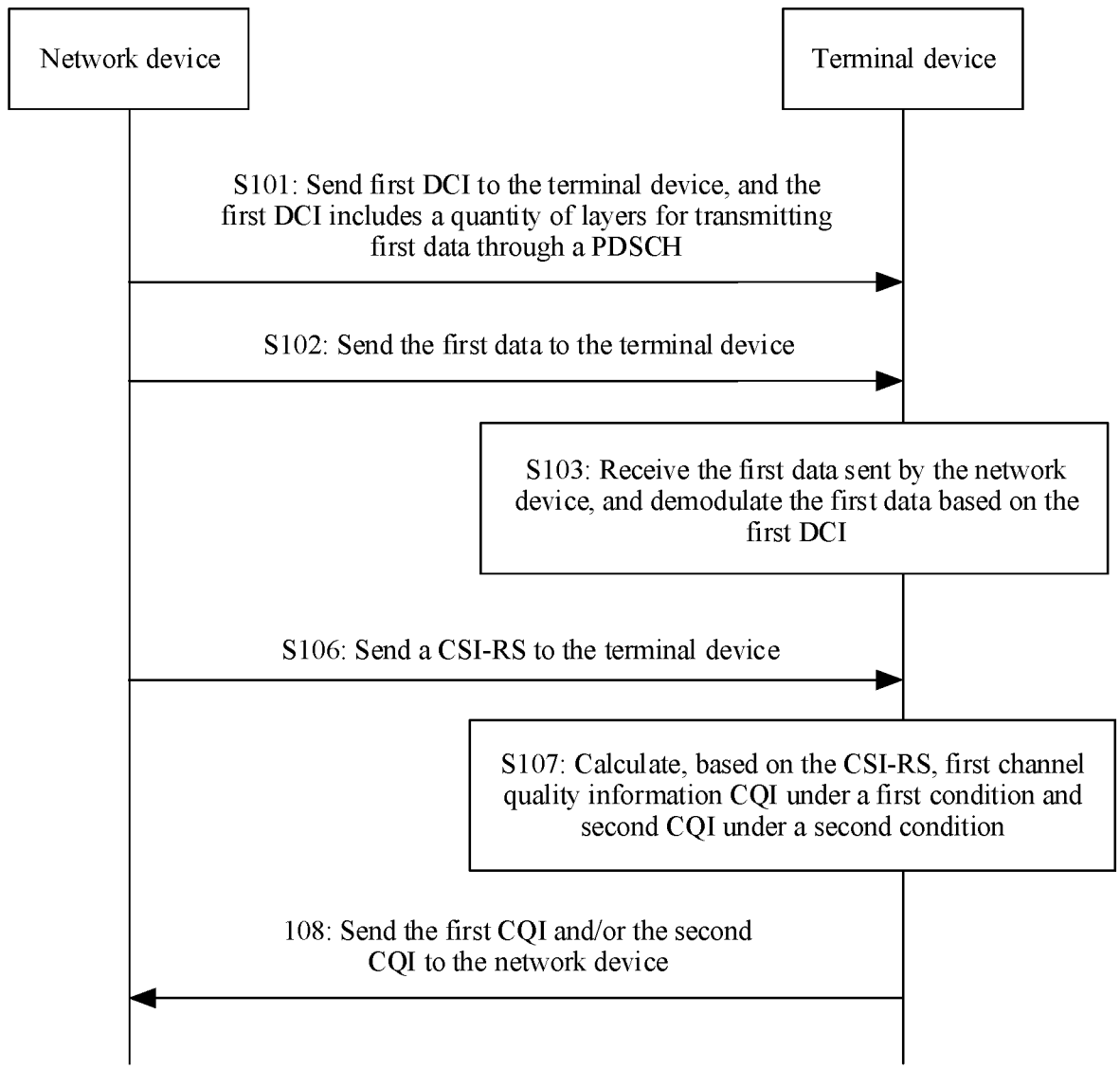
FIG. 3 is an interaction flowchart of an embodiment of a data transmission method according to this application.

FIG. 3 is an interaction flowchart of an embodiment of a data transmission method according to this application. In this embodiment, interaction between a terminal device and a network device is used as an example for description. As shown in FIG. 3, based on the method shown in FIG. 2, the method in this embodiment may further include the following steps.

S106: The network device sends a channel state information reference signal (Channel state information reference signal, CSI-RS) to the terminal device.

Specifically, the network device sends the CSI-RS to the terminal device on a configured CSI-RS resource.

S107: The terminal device receives the CSI-RS, and calculates, by using the CSI-RS, first channel quality information CQI under the first condition or second CQI under the second condition.

Specifically, the terminal device calculates CQI based on the received CSI-RS. Because a quantity of layers of the PDSCH scheduled by the network device is unclear, the terminal device needs to calculate CQI of two quantities of receive antennas. The first CQI corresponds to channel quality when the terminal device uses N1 receive antennas, and the second CQI corresponds to channel quality when the terminal device uses N2 receive antennas.

S108: The terminal device sends the first CQI and/or the second CQI to the network device.

Specifically, the terminal device may send the first CQI and the second CQI to the network device. Alternatively, the terminal device sends the first CQI or the second CQI to the network device, and the network device estimates the second CQI based on the received first CQI or estimates the first CQI based on the received second CQI. For example, the second CQI is equal to the first CQI plus an offset. Alternatively, the terminal device sends the first CQI or the second CQI to the network device based on an indication of the network device. For example, DCI signaling is used to indicate the terminal device to feed back the first CQI or the second CQI.

After receiving the first CQI and/or the second CQI, the network device determines, based on the received CQI, an MCS for data transmission. Because different quantities of receive antennas correspond to different channels, ranges of modulation and coding schemes (Modulation and coding scheme, MCS) that can be scheduled by the network device are different. For example, a range of MCSs that can be scheduled by N1 receive antennas is represented as an MSC set 1, and a range of MCSs that can be scheduled by N2 receive antennas is represented as an MSC set 2, where a code rate of the MCS set 1 is less than a code rate of the MSC set 2, and the MCS set 1 may be a subset of the MSC set 2. The network device indicates, through the DCI, an MCS of the data sent through the PDSCH.

The terminal device receives the DCI, and receives the data transmitted through the PDSCH. If a scheduling latency indicated by the DCI is relatively large, for example, during cross-slot scheduling, the terminal device enables N2 receive antennas to receive the data transmitted through the PDSCH. For a specific process, refer to S101 to S103.

In this embodiment, optionally, when the first data sent by the network device through the PDSCH is received in a time unit in which a CSI-RS resource is located, if a quantity of antenna ports configured in the CSI-RS resource is greater than N1, the quantity of layers of the first data is less than or equal to N2. Specifically, the network device configures a CSI-RS resource configuration, a CSI reporting configuration, and a CSI measurement configuration by using radio resource control (Radio Resource Control, RRC) signaling, and the network device sends the CSI-RS to the terminal device on the configured CSI-RS resource. The quantity of antenna ports of the CSI-RS resource is configured in the CSI-RS resource configuration. If the quantity of antenna ports of the CSI-RS resource configuration is greater than N1, the terminal device enables N2 receive antennas in a slot in which the CSI-RS resource is located, to receive the CSI-RS and the data transmitted through the PDSCH. This is because the CSI-RS occupies only a part of resources in one slot, and another resource may be used to send data, the terminal device may receive, in one slot, the CSI-RS and the data sent through the PDSCH.

In this embodiment, the terminal device calculates, based on the CSI-RS, the first channel quality information CQI under the first condition and the second CQI under the second condition, and sends the first CQI and/or the second CQI to the network device. Therefore, a problem that how the terminal device reports CQI to the network device when the receive antennas are dynamically adjusted in different conditions is resolved, and the network device may obtain accurate CQI, so as to determine, based on the CQI, an MCS of data sent through the PDSCH.

The technical solution of the method embodiment shown in FIG. 2 is described in detail below by using a specific embodiment. In this embodiment, an example in which the first condition is same-slot scheduling and the second condition is cross-slot scheduling is used.

Figure 4:
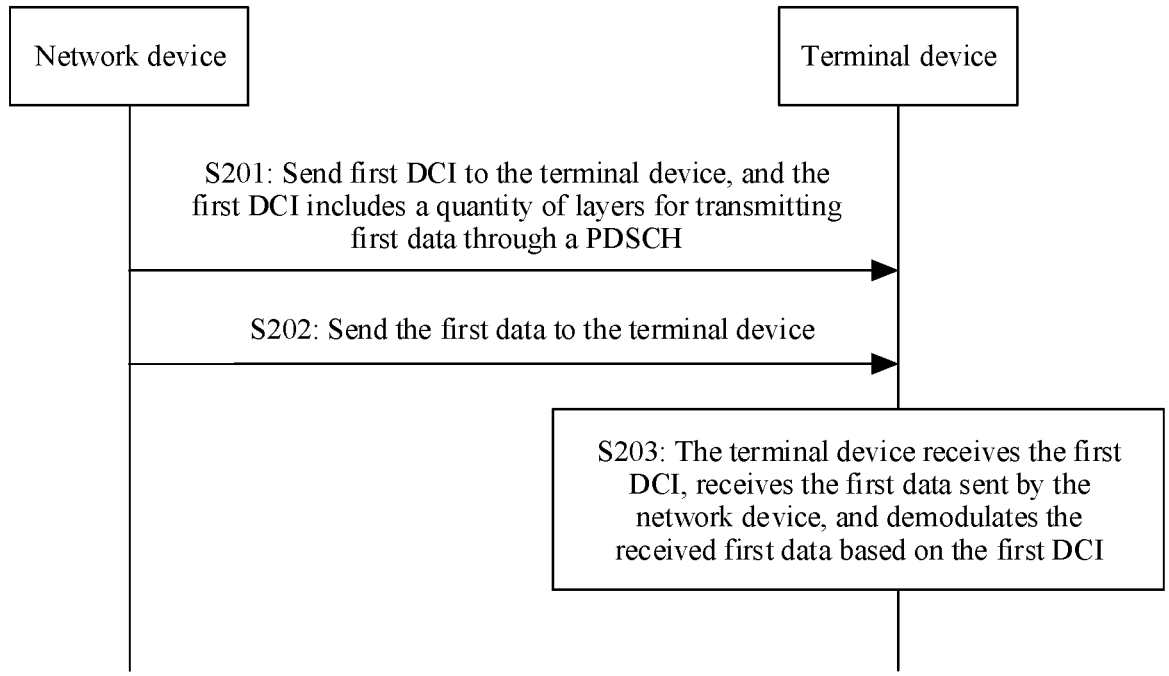
FIG. 4 is an interaction flowchart of an embodiment of a data transmission method according to this application.

FIG. 4 is an interaction flowchart of an embodiment of a data transmission method according to this application. In this embodiment, interaction between a terminal device and a network device is used as an example for description. As shown in FIG. 4, the method in this embodiment may include the following steps.

S201: The network device sends first DCI to the terminal device, where the first DCI includes a quantity of layers for transmitting first data through a PDSCH, and during same-slot scheduling, the quantity of layers of the first data is less than or equal to N1; and during cross-slot scheduling, the quantity of layers of the first data is less than or equal to N2, N1 is less than N2, N2 is a maximum quantity of layers, for transmitting data through the PDSCH, supported by the terminal device, and N1 is a positive integer.

S202: The network device sends the first data to the terminal device.

S203: The terminal device receives the first DCI, receives the first data sent by the network device, and demodulates the received first data based on the first DCI.

Figure 5:
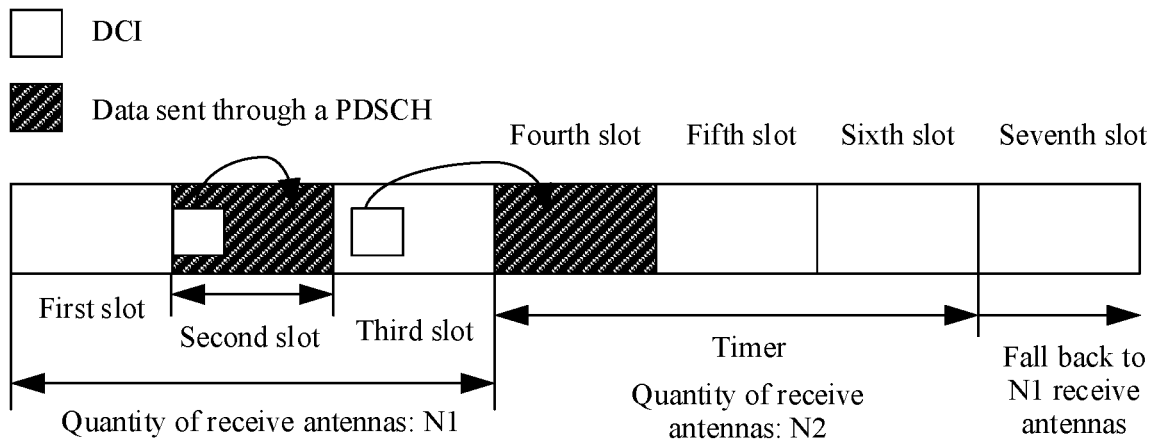
FIG. 5 is a schematic diagram of a process in which a terminal device switches from a low-power consumption state to a high-power consumption state and then falls back to the low-power consumption state according to this application.

With reference to FIG. 5, a process in which a terminal device switches from a low-power consumption state to a high-power consumption state and then falls back to the low-power consumption state in this embodiment is described. FIG. 5 is a schematic diagram of a process in which a terminal device switches from a low-power consumption state to a high-power consumption state and then falls back to the low-power consumption state according to this application. As shown in FIG. 5, in a second slot, a time point at which a network device sends data to the terminal device through a PDSCH and a time point at which the network device sends first DCI to the terminal device are in a same slot, in other words, same-slot scheduling is performed. In the first DCI sent by the network device, if an indicated quantity of layers of first data is less than or equal to N1, the terminal device enables, for example, N1 antennas, to receive the data sent by the network device. In a third slot after the second slot, the time point at which the network device sends DCI to the terminal device is in the third slot, and the time point at which the network device sends the data to the terminal device through the PDSCH is in a fourth slot. The two time points are not in a same slot, in other words, cross-slot scheduling is performed. In the first DCI sent by the network device, if the indicated quantity of layers of the first data is less than or equal to N2, the terminal device enables, for example, N2 antennas, to receive the data sent by the network device. In a seventh slot, the terminal device falls back to the low-power consumption state, and a quantity of layers for receiving, by the terminal device, second data that is sent by the network device through the PDSCH is less than or equal to N1. For a specific fallback manner, reference may be made to four implementable manners in the embodiment shown in FIG. 2, and details are not described herein again.

Figure 6:
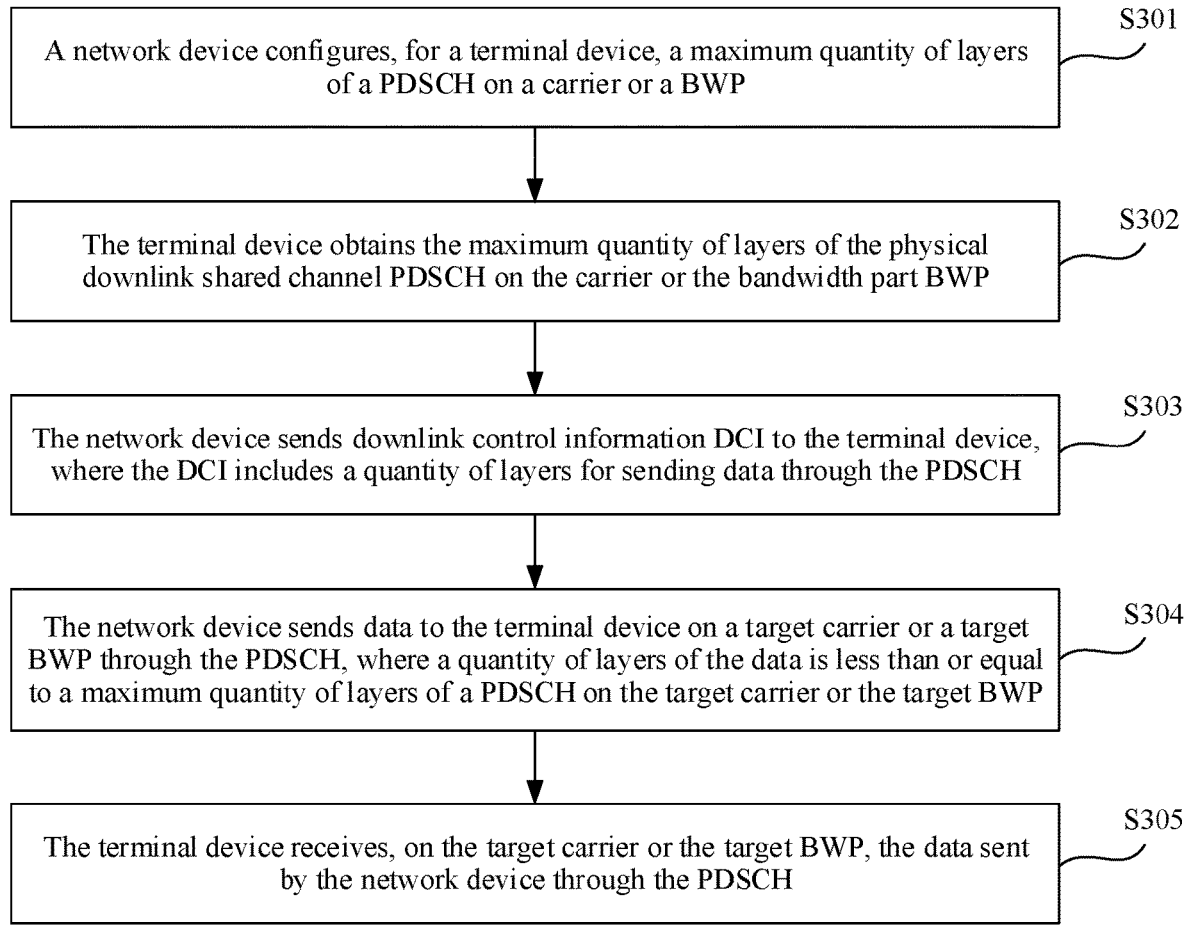
FIG. 6 is a flowchart of an embodiment of a data transmission method according to this application.

FIG. 6 is a flowchart of an embodiment of a data transmission method according to this application. As shown in FIG. 6, the method in this embodiment may include the following steps.

S301: A network device configures, for a terminal device, a maximum quantity of layers of a PDSCH on a carrier or a bandwidth part (bandwidth part, BWP).

In a multi-carrier scenario, the network device configures a plurality of carriers by using RRC signaling, and may configure a maximum quantity of layers of a PDSCH for each carrier. Optionally, the network device may configure, for the terminal device, the maximum quantity of layers of the PDSCH on the carrier or the BWP through carrier configuration information or BWP configuration information. The carrier configuration information includes the maximum quantity of layers of the PDSCH on the carrier. For example, a maximum quantity of layers of a PDSCH on a carrier 1 is N1, and a maximum quantity of layers of a PDSCH on a carrier 2 is N2, where N1 is not equal to N2, and N1 is less than N2. Maximum quantities of layers of PDSCHs configured for different carriers are different, or a maximum quantity of layers of a PDSCH on a primary carrier may be different from that on a secondary carrier. For example, the maximum quantity of layers of the PDSCH on the primary carrier is N1, and the maximum quantity of layers of the PDSCH on the secondary carrier 2 is N2. Alternatively, the carrier configuration information includes at least one maximum quantity of layers of a PDSCH, and one maximum quantity of layers of a PDSCH is used to indicate a maximum quantity of layers of a PDSCH of one group of carriers. For example, there are four carriers: CC1, CC2, CC3, and CC4, CC1 and CC2 are used as a group of carriers, CC3 and CC4 are used as a group of carriers, and one maximum quantity of layers of a PDSCH may be configured for each group of carriers.

NR supports configuration of a plurality of BWPs on each carrier. The network device configures the BWP by using the RRC signaling, and may configure a maximum quantity of layers of a PDSCH for each BWP or each BWP group. The BWP configuration information includes a maximum quantity of layers of a PDSCH in each BWP. For example, a maximum quantity of layers of a PDSCH in a BWP 1 is N1, and a maximum quantity of layers of a PDSCH in a BWP 2 is N2, where N1 is not equal to N2, and N1 is less than N2. Alternatively, a maximum quantity of layers of a PDSCH in a default BWP (default BWP) may be N1, and a maximum quantity of layers of a PDSCH in a non-default BWP is N2. If the network device needs to switch from the BWP 1 to the BWP 2, a slot offset needs to be added to an original scheduling latency, so that the terminal device enables more receive antennas. After the network device performs scheduling, when the terminal device receives, in the BWP 1, data sent through the PDSCH, only N1 receive antennas need to be enabled, or when the terminal device receives, in the BWP 2, data sent through the PDSCH, N2 receive antennas need to be enabled. Alternatively, the BWP configuration information includes at least one maximum quantity of layers of a PDSCH, and one maximum quantity of layers of a PDSCH is used to indicate a maximum quantity of layers of a PDSCH in one group of BWPs. For example, there are four groups of BWPs, and one maximum quantity of layers of a PDSCH may be configured for each group of BWPs.

The network device may indicate a default BWP identifier (ID) by using the RRC signaling, and the terminal device determines the default BWP based on the default BWP identifier. If the network device does not indicate the default BWP identifier (ID), an initial BWP (initial BWP) is considered as the default BWP.

The network device may configure the maximum quantity of layers of the PDSCH through configuration information of the PDSCH in the BWP configuration information, but this is not limited. In other words, the configuration information of the PDSCH in the BWP configuration information includes the maximum quantity of layers of the PDSCH. The network device may further configure association between the maximum quantity of layers of the PDSCH and a BWP identifier, to indicate a maximum quantity of layers of a PDSCH in a corresponding BWP. One BWP corresponds to one BWP identifier. The network device configures the maximum quantity of layers of the PDSCH for the BWP group. One BWP group may include one or more BWPs, and the network device and the terminal device may directly or indirectly determine information about the BWP group. The network device may send the information about the BWP group to the terminal device by using signaling. It may also be considered that one configuration information indicating the maximum quantity of layers of the PDSCH is applied to one or more BWPs, and the one or more BWPs are one BWP group. In other words, that the network device configures the maximum quantity of layers of the PDSCH for the BWP group means that the network device applies, to one or more BWPs, one configuration information indicating the maximum quantity of layers of the PDSCH. For example, a maximum quantity N1 of layers of a PDSCH is configured for the default BWP, and a maximum quantity N2 of layers of a PDSCH is configured for the non-default BWP.

S302: The terminal device obtains the maximum quantity of layers of the physical downlink shared channel PDSCH on the carrier or the bandwidth part BWP.

Specifically, carrier configuration information or BWP configuration information sent by the network device may be received, or carrier configuration information or BWP configuration information statically configured by the network device may be obtained.

S303: The network device sends downlink control information DCI to the terminal device, where the DCI includes a quantity of layers for sending data through the PDSCH.

S304: The network device sends data to the terminal device on a target carrier or in a target BWP through the PDSCH, where a quantity of layers of the data is less than or equal to a maximum quantity of layers of a PDSCH on the target carrier or in the target BWP.

S305: The terminal device receives, on the target carrier or in the target BWP, the data sent by the network device through the PDSCH.

According to the data transmission method provided in this embodiment, the maximum quantity of layers of the PDSCH is configured for each carrier or carrier group, or the maximum quantity of layers of the PDSCH is configured for each BWP or BWP group. Therefore, when receiving, on a corresponding carrier or in a corresponding BWP, the data sent through the PDSCH, the terminal device may enable a corresponding quantity of receive antennas based on a configured maximum quantity of layers of a PDSCH. When the data sent through the PDSCH is received on some carriers or in some BWPs, a relatively small quantity of receive antennas may be enabled, so that radio frequency power consumption of the terminal device can be reduced.

Figure 7:
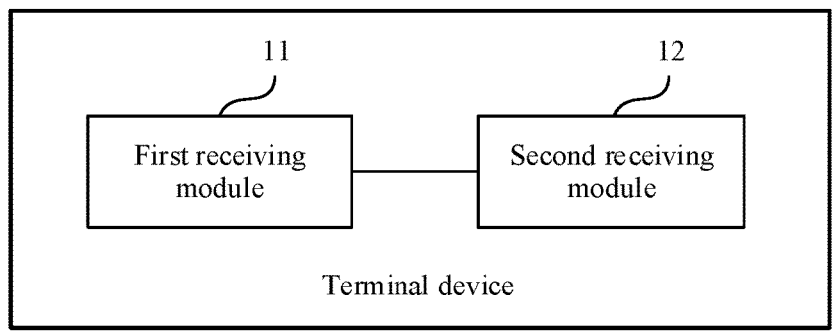
FIG. 7 is a schematic structural diagram of an embodiment of a terminal device according to this application.

FIG. 7 is a schematic structural diagram of an embodiment of a terminal device according to this application. As shown in FIG. 7, the apparatus in this embodiment may include a first receiving module 11 and a second receiving module 12.

The first receiving module 11 is configured to receive first downlink control information DCI sent by a network device, where the first DCI includes a quantity of layers for transmitting first data through a physical downlink shared channel PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by the terminal device, and N1 is a positive integer.

The second receiving module 12 is configured to: receive the first data sent by the network device, and demodulate the first data based on the first DCI.

Optionally, the first DCI further includes a slot offset of the first data in time.

When the quantity of layers of the first data is less than or equal to N1, the slot offset is less than a preset value.

When the quantity of layers of the first data is switched from being less than or equal to N1 to being less than or equal to N2, the slot offset is greater than or equal to the preset value.

The terminal device in this embodiment may be configured to perform the technical solution in the method embodiment shown in FIG. 2. Implementation principles thereof are similar, and details are not described herein again.

According to the terminal device provided in this embodiment, when the terminal device receives the first data sent by the network device through the PDSCH, under the first condition, the terminal device may enable a relatively small quantity of receive antennas, thereby reducing radio frequency power consumption of the terminal device. Under the second condition, when receiving the first data sent by the network device through the PDSCH, the terminal device may enable a relatively large quantity of receive antennas, and the receive antennas may be dynamically adjusted, thereby reducing radio frequency power consumption of the terminal device.

Figure 8:
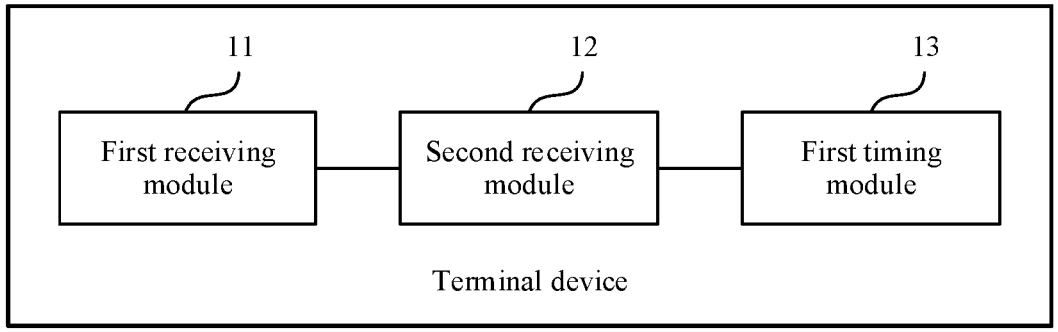
FIG. 8 is a schematic structural diagram of an embodiment of a terminal device according to this application.

FIG. 8 is a schematic structural diagram of an embodiment of a terminal device according to this application. As shown in FIG. 8, based on a structure of the apparatus shown in FIG. 7, the apparatus in this embodiment may further include a first timing module 13. The first timing module 13 is configured to: after the second receiving module 12 receives the first data sent by the network device and demodulates the first data based on the first DCI, start a timer, and start timing from a slot in which the first data is located.

When the second receiving module 12 does not receive, in preset X slots, data sent through the PDSCH, and the timer expires, a quantity of layers of second data that is sent by the network device through the PDSCH and that is received by the second receiving module is less than or equal to N1.

Alternatively, when the second receiving module 12 receives, in preset X slots, third data sent by the network device through the PDSCH, the first timing module 13 enables the timer to perform re-timing.

Further, if the quantity of layers of the second data is greater than a first preset quantity of layers, the first timing module enables the timer to perform re-timing.

If the quantity of layers of the second data is less than or equal to a first preset quantity of layers, the first timing module enables the timer to continue to perform timing, and when the timer expires, a quantity of layers of the third data that is sent by the network device through the PDSCH and that is received by the second receiving module is less than or equal to N1.

The apparatus in this embodiment may be configured to perform the technical solution in the method embodiment shown in FIG. 2. Implementation principles thereof are similar, and details are not described herein again.

According to the terminal device provided in this embodiment, after the terminal device enables N2 receive antennas to receive the first data sent by the network device, the terminal device may fall back, by setting the timer, to working by using receive antennas whose quantity is less than or equal to N1, thereby reducing power consumption of the terminal device.

Figure 9:
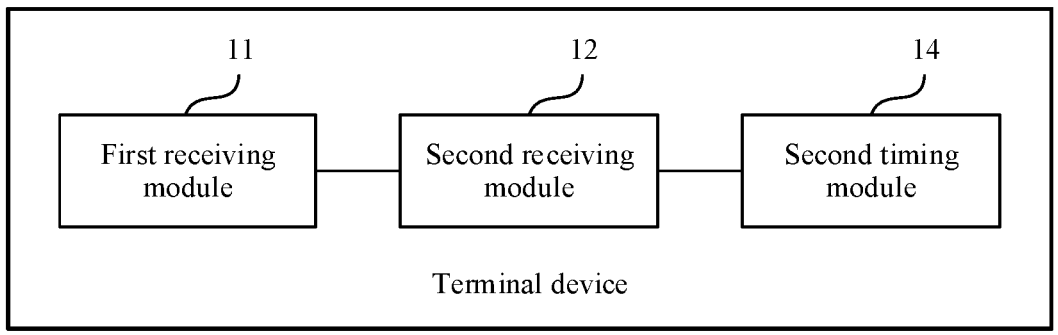
FIG. 9 is a schematic structural diagram of an embodiment of a terminal device according to this application.

FIG. 9 is a schematic structural diagram of an embodiment of a terminal device according to this application. As shown in FIG. 9, based on a structure of the apparatus shown in FIG. 7, the apparatus in this embodiment may further include a second timing module 14. The second timing module 14 is configured to: after the second receiving module 12 receives the first data sent by the network device and demodulates the first data based on the first DCI, start a timer, and start timing from a position of the first DCI.

When the second receiving module 12 does not receive second DCI in preset X slots, a quantity of layers of second data that is sent by the network device through the PDSCH and that is received by the second receiving module is less than or equal to N1.

Alternatively, when the second receiving module 12 receives second DCI in preset X slots, the timer performs re-timing, where the second DCI includes a quantity of layers of third data transmitted through the PDSCH.

Further, if a quantity of layers, of the second data, indicated by the second DCI is greater than a first preset quantity of layers, the second timing module enables the timer to perform re-timing.

If a quantity of layers, of the second data, indicated by the second DCI is less than or equal to a first preset quantity of layers, the second timing module enables the timer to continue to perform timing, and when the timer expires, a quantity of layers of the third data that is sent by the network device through the PDSCH and that is received by the second receiving module is less than or equal to N1.

According to the terminal device provided in this embodiment, after the terminal device enables N2 receive antennas to receive the first data sent by the network device, the terminal device may fall back, by setting the timer, to working by using receive antennas whose quantity is less than or equal to N1, thereby reducing power consumption of the terminal device.

In the foregoing embodiment, optionally, under the second condition, when a quantity of times that a quantity of layers of second data is less than a second preset quantity of layers is equal to a preset threshold, a quantity of layers of third data that is sent by the network device through the PDSCH and that is received by the second receiving module 12 is less than or equal to N1, and the preset threshold is a positive integer.

The apparatus in this embodiment may be configured to perform the technical solution in the method embodiment shown in FIG. 2. Implementation principles thereof are similar, and details are not described herein again.

According to the terminal device provided in this embodiment, after the terminal device enables N2 receive antennas to receive the first data sent by the network device, the terminal device may fall back, by setting a counting apparatus, to working by using receive antennas whose quantity is less than or equal to N1, thereby reducing power consumption of the terminal device.

Figure 10:
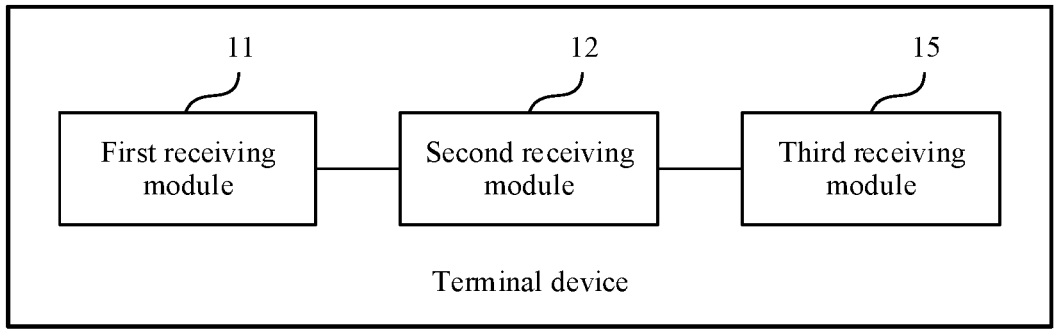
FIG. 10 is a schematic structural diagram of an embodiment of a terminal device according to this application.

FIG. 10 is a schematic structural diagram of an embodiment of a terminal device according to this application. As shown in FIG. 10, based on a structure of the apparatus shown in FIG. 7, the apparatus in this embodiment may further include a third receiving module 15. The third receiving module 15 is configured to: after the second receiving module 12 receives the first data sent by the network device and demodulates the first data based on the first DCI, receive indication information that is sent by the network device and that is used to indicate that a quantity of layers for receiving second data that is sent by the network device through the PDSCH is less than or equal to N1.

According to the terminal device provided in this embodiment, after the terminal device enables N2 receive antennas to receive the first data sent by the network device, the terminal device may fall back, by using the indication information of the network device, to working by using receive antennas whose quantity is less than or equal to N1, thereby reducing power consumption of the terminal device.

Figure 11:
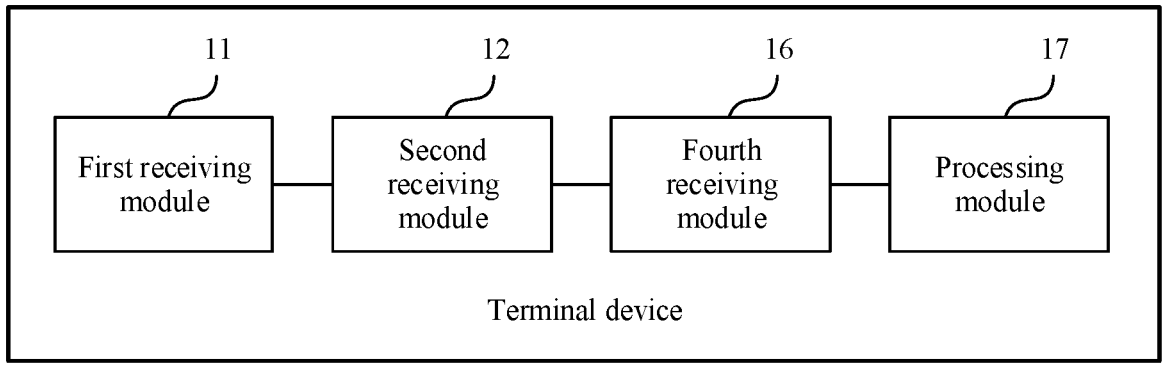
FIG. 11 is a schematic structural diagram of an embodiment of a terminal device according to this application.

FIG. 11 is a schematic structural diagram of an embodiment of a terminal device according to this application. As shown in FIG. 11, based on a structure of the apparatus shown in any one of FIG. 7 to FIG. 10, the apparatus in this embodiment may further include a fourth receiving module 16 and a processing module 17. The fourth receiving module 16 is configured to receive a channel state information reference signal CSI-RS sent by the network device.

The processing module 17 is configured to: calculate, based on the CSI-RS, first channel quality information CQI under the first condition and second CQI under the second condition, and send the first CQI and/or the second CQI to the network device.

In the foregoing embodiment, optionally, when the first data sent by the network device is received in a time unit in which a CSI-RS resource is located, if a quantity of antenna ports configured in the CSI-RS resource is greater than N1, the quantity of layers of the first data is less than or equal to N2.

The apparatus in this embodiment may be configured to perform the technical solution in the method embodiment shown in FIG. 2. Implementation principles thereof are similar, and details are not described herein again.

According to the terminal device provided in this embodiment, the terminal device calculates, based on the CSI-RS, the first channel quality information CQI under the first condition and the second CQI under the second condition, and sends the first CQI and/or the second CQI to the network device. Therefore, a problem that how the terminal device reports CQI to the network device when the receive antennas are dynamically adjusted in different conditions is resolved, and the network device may obtain accurate CQI, so as to determine, based on the CQI, an MCS of data sent through the PDSCH.

Figure 12:
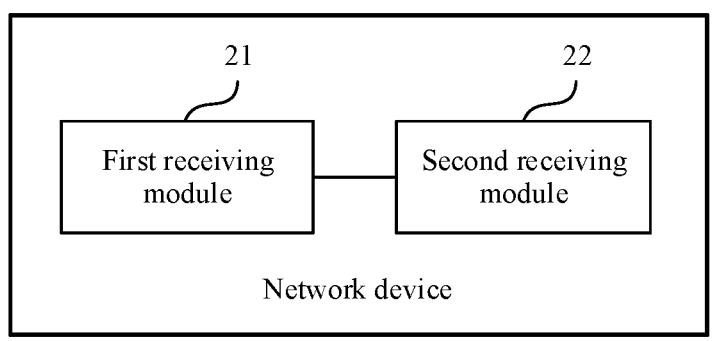
FIG. 12 is a schematic structural diagram of an embodiment of a network device according to this application.

FIG. 12 is a schematic structural diagram of an embodiment of a network device according to this application. As shown in FIG. 12, the apparatus in this embodiment may include a first sending module 21 and a second sending module 22.

The first sending module 21 is configured to send first downlink control information DCI to a terminal device, where the first DCI includes a quantity of layers for transmitting first data through a physical downlink shared channel PDSCH, and under a first condition, the quantity of layers of the first data is less than or equal to N1; and under a second condition, the quantity of layers of the first data is less than or equal to N2, N1 is less than N2, N2 is a maximum quantity of layers, for transmitting data through the PDSCH, supported by the terminal device, and N1 is a positive integer.

The second sending module 22 is configured to send the first data to the terminal device.

Optionally, the first DCI further includes a slot offset of the first data in time.

When the quantity of layers of the first data is less than or equal to N1, the slot offset is less than a preset value.

When the quantity of layers of the first data is switched from being less than or equal to N1 to being less than or equal to N2, the slot offset is greater than or equal to the preset value.

The network device in this embodiment may be configured to perform the technical solution in the method embodiment shown in FIG. 2. Implementation principles thereof are similar, and details are not described herein again.

According to the network device provided in this embodiment, when the network device needs to send data, the network device first sends the first DCI to the terminal device. The first DCI includes the quantity of layers for transmitting the first data through the PDSCH, and under the first condition, the quantity of layers of the first data is less than or equal to N1; and under the second condition, the quantity of layers of the first data is less than or equal to N2, N1 is less than N2, and N2 is the maximum quantity of layers, for transmitting data through the PDSCH, supported by the terminal device. Therefore, when receiving the first data sent by the network device through the PDSCH, the terminal device may enable a relatively small quantity of receive antennas under the first condition, thereby reducing radio frequency power consumption of the terminal device. Under the second condition, when receiving the first data sent by the network device through the PDSCH, the terminal device may enable a relatively large quantity of receive antennas, and the receive antennas may be dynamically adjusted, thereby reducing radio frequency power consumption of the terminal device.

Figure 13:
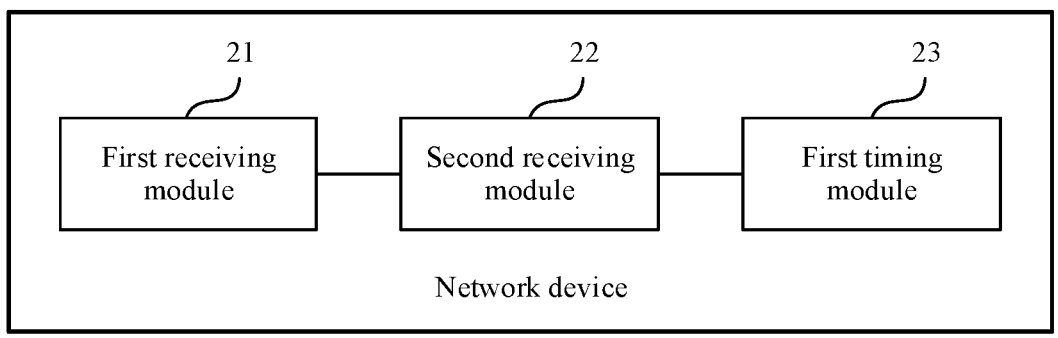
FIG. 13 is a schematic structural diagram of an embodiment of a network device according to this application.

FIG. 13 is a schematic structural diagram of an embodiment of a network device according to this application. As shown in FIG. 13, based on a structure of the apparatus shown in FIG. 12, under the second condition, the apparatus in this embodiment may further include a first timing module 23.

The first timing module 23 is configured to: after the second sending module sends the first data to the terminal device, start a timer, and start timing from a slot in which the first data is located.

When the second sending module 22 does not send, in preset X slots, data to the terminal device through the PDSCH, a quantity of layers of second data that is sent by the second sending module 22 to the terminal device through the PDSCH is less than or equal to N1.

Alternatively, when the second sending module 22 sends, in preset X slots, third data to the terminal device through the PDSCH, the first timing module 23 enables the timer to perform re-timing.

Further, if the quantity of layers of the second data is greater than a first preset quantity of layers, the first timing module 23 enables the timer to perform re-timing.

If the quantity of layers of the second data is less than or equal to a first preset quantity of layers, the first timing module 23 enables the timer to continue to perform timing, and when the timer expires, a quantity of layers the third data that is sent by the second sending module 22 to the terminal device through the PDSCH is less than or equal to N1.

The network device in this embodiment may be configured to perform the technical solution in the method embodiment shown in FIG. 2. Technical effects and implementation principles thereof are similar, and details are not described herein again.

Figure 14:
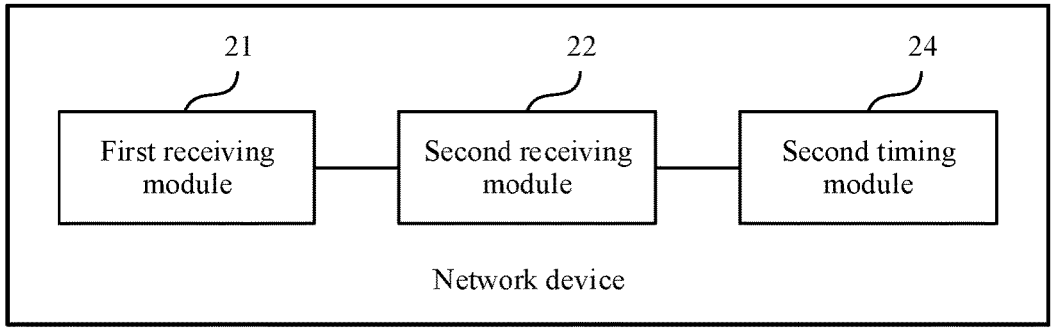
FIG. 14 is a schematic structural diagram of an embodiment of a network device according to this application.

FIG. 14 is a schematic structural diagram of an embodiment of a network device according to this application. As shown in FIG. 14, based on a structure of the apparatus shown in FIG. 12, under the second condition, the apparatus in this embodiment may further include a second timing module 24. The second timing module 24 is configured to: after the second sending module sends the first data to the terminal device, start a timer, and start timing from a position of the first DCI.

When the second sending module 22 does not send second DCI to the terminal device in preset X slots, a quantity of layers of second data that is sent by the second sending module 22 to the terminal device through the PDSCH is less than or equal to N1.

Alternatively, when the second sending module 22 sends second DCI to the terminal device in preset X slots, the second timing module 24 enables the timer to perform re-timing, where the second DCI includes a quantity of layers of third data transmitted through the PDSCH.

Further, if a quantity of layers, of the second data, indicated by the second DCI is greater than a first preset quantity of layers, the second timing module 24 enables the timer to perform re-timing.

If a quantity of layers, of the second data, indicated by the second DCI is less than or equal to a first preset quantity of layers, the second timing module 24 enables the timer to continue to perform timing, and when the timer expires, a quantity of layers of the third data that is sent by the second sending module 22 to the terminal device through the PDSCH is less than or equal to N1.

In the foregoing embodiment, under the second condition, when a quantity of times that a quantity of layers of second data is less than a second preset quantity of layers is equal to a preset threshold, a quantity of layers of third data that is sent by the second sending module 22 to the terminal device through the PDSCH is less than or equal to N1, and the preset threshold is a positive integer.

The network device in this embodiment may be configured to perform the technical solution in the method embodiment shown in FIG. 2. Technical effects and implementation principles thereof are similar, and details are not described herein again.

Figure 15:
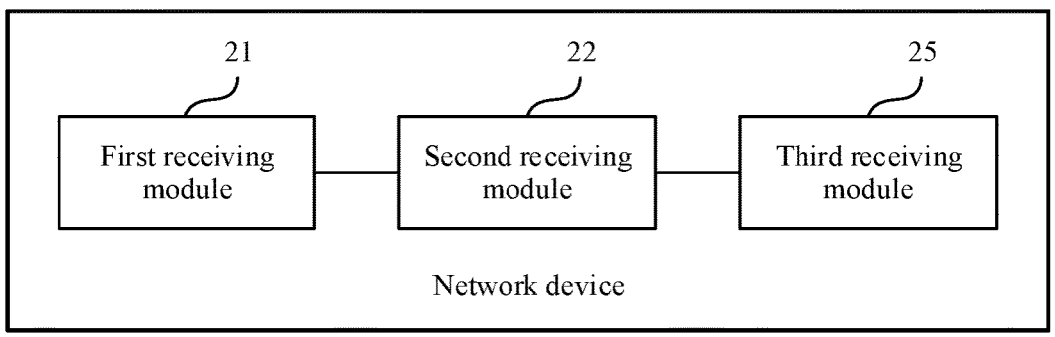
FIG. 15 is a schematic structural diagram of an embodiment of a network device according to this application.

FIG. 15 is a schematic structural diagram of an embodiment of a network device according to this application. As shown in FIG. 15, based on a structure of the apparatus shown in FIG. 12, the apparatus in this embodiment may further include a third sending module 25. The third sending module 25 is configured to: after the second sending module 22 sends the first data to the terminal device, send, to the terminal device, indication information used to indicate that a quantity of layers for sending second data to the terminal device through the PDSCH is less than or equal to N1.

The network device in this embodiment may be configured to perform the technical solution in the method embodiment shown in FIG. 2. Technical effects and implementation principles thereof are similar, and details are not described herein again.

Figure 16:
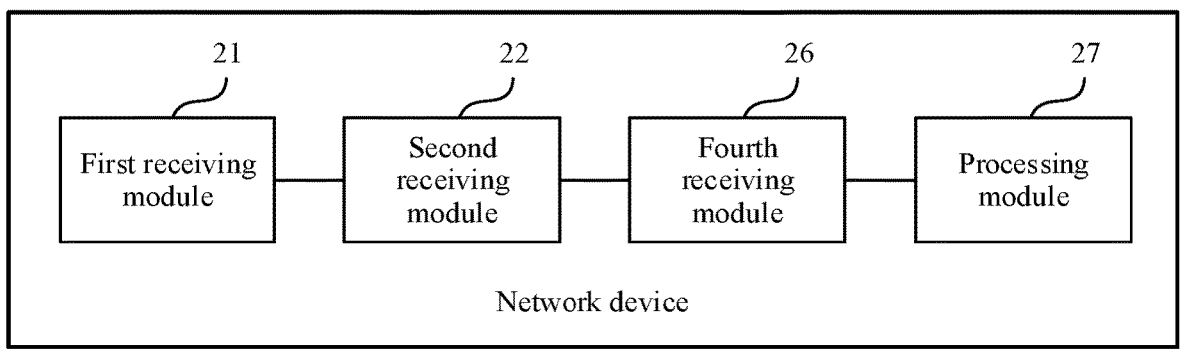
FIG. 16 is a schematic structural diagram of an embodiment of a network device according to this application.

FIG. 16 is a schematic structural diagram of an embodiment of a network device according to this application. As shown in FIG. 16, based on a structure of the apparatus shown in any one of FIG. 12 to FIG. 15, the apparatus in this embodiment may further include a fourth sending module 26 and a receiving module 27. The fourth sending module 26 is configured to send a channel state information reference signal CSI-RS to the terminal device, so that the terminal device calculates, based on the CSI-RS, first channel quality information CQI under the first condition and second CQI under the second condition.

The receiving module 27 is configured to receive the first CQI and/or the second CQI sent by the terminal device.

In the foregoing embodiment, when the first data is sent to the terminal device in a time unit in which a CSI-RS resource is located, if a quantity of antenna ports configured in the CSI-RS resource is greater than N1, the quantity of layers of the first data is less than or equal to N2.

The network device in this embodiment may be configured to perform the technical solution in the method embodiment shown in FIG. 2. Technical effects and implementation principles thereof are similar, and details are not described herein again.

Figure 17:
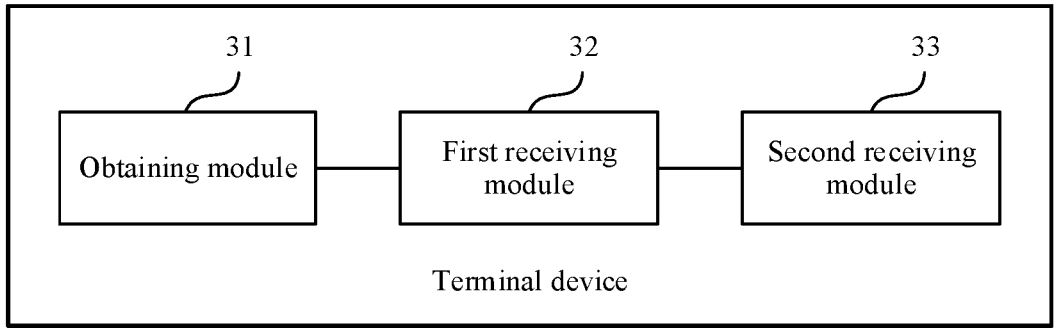
FIG. 17 is a schematic structural diagram of an embodiment of a terminal device according to this application.

FIG. 17 is a schematic structural diagram of an embodiment of a terminal device according to this application. As shown in FIG. 17, the apparatus in this embodiment may include an obtaining module 31, a first receiving module 32, and a second receiving module 33. The obtaining module 31 is configured to obtain a maximum quantity of layers of a physical downlink shared channel PDSCH on a carrier or in a bandwidth part BWP.

The first receiving module 32 is configured to receive downlink control information DCI sent by a network device, where the DCI includes a quantity of layers for sending data through the PDSCH.

The second receiving module 33 is configured to: receive, on a target carrier or in a target BWP, the data sent by the network device through the PDSCH, and demodulate the data based on the DCI, where a quantity of layers of the data is less than or equal to a maximum quantity of layers of a PDSCH on the target carrier or in the target BWP.

Optionally, the obtaining module 31 is configured to: obtain carrier configuration information or BWP configuration information, where the carrier configuration information includes a maximum quantity of layers of a PDSCH of each carrier, or the carrier configuration information includes at least one maximum quantity of layers of a PDSCH, and one maximum quantity of layers of a PDSCH is used to indicate a maximum quantity of layers of a PDSCH of one group of carriers; and the BWP configuration information includes a maximum quantity of layers of a PDSCH in each BWP, or the BWP configuration information includes at least one maximum quantity of layers of a PDSCH, and one maximum quantity of layers of a PDSCH is used to indicate a maximum quantity of layers of a PDSCH in one group of BWPs; and obtain the maximum quantity of layers of the PDSCH of each carrier based on the carrier configuration information, or obtain the maximum quantity of layers of the PDSCH in each BWP based on the BWP configuration information.

The terminal device in this embodiment may be configured to perform the technical solution in the method embodiment shown in FIG. 6. Technical effects and implementation principles thereof are similar, and details are not described herein again.

Figure 18:
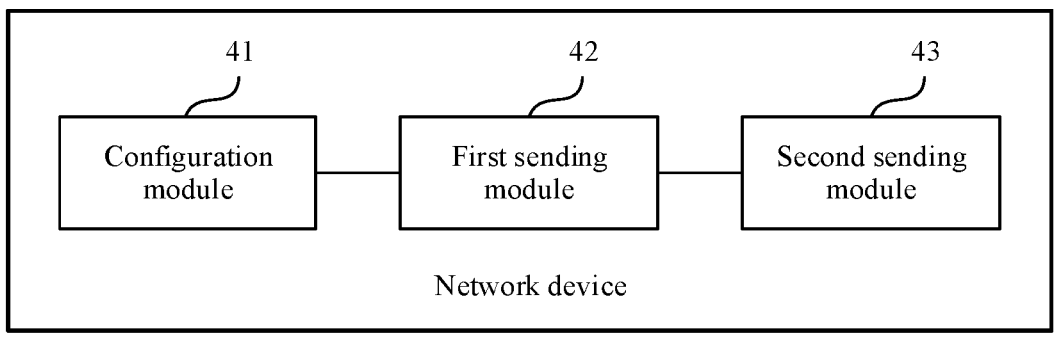
FIG. 18 is a schematic structural diagram of an embodiment of a network device according to this application.

FIG. 18 is a schematic structural diagram of an embodiment of a network device according to this application. As shown in FIG. 18, the apparatus in this embodiment may include a configuration module 41, a first sending module 42, and a second sending module 43.

The configuration module 41 is configured to configure, for a terminal device, a maximum quantity of layers of a physical downlink shared channel PDSCH on a carrier or in a bandwidth part BWP.

The first sending module 42 is configured to send downlink control information DCI to the terminal device, where the DCI includes a quantity of layers for sending data through the PDSCH.

The second sending module 43 is configured to send data to the terminal device on a target carrier or in a target BWP through the PDSCH, where a quantity of layers of the data is less than or equal to a maximum quantity of layers of a PDSCH on the target carrier or in the target BWP.

Optionally, the configuration module 41 is configured to: configure, for the terminal device, the maximum quantity of layers of the PDSCH on the carrier or the BWP through carrier configuration information or BWP configuration information, where the carrier configuration information includes a maximum quantity of layers of a PDSCH of each carrier, or the carrier configuration information includes at least one maximum quantity of layers of a PDSCH, and one maximum quantity of layers of a PDSCH is used to indicate a maximum quantity of layers of a PDSCH of one group of carriers; and the BWP configuration information includes a maximum quantity of layers of a PDSCH in each BWP, or the BWP configuration information includes at least one maximum quantity of layers of a PDSCH, and one maximum quantity of layers of a PDSCH is used to indicate a maximum quantity of layers of a PDSCH in one group of BWPs.

The network device in this embodiment may be configured to perform the technical solution in the method embodiment shown in FIG. 6. Technical effects and implementation principles thereof are similar, and details are not described herein again.

In this application, functional modules of the terminal device or the network device may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in this embodiment of this application, module division is an example, and is merely logical function division. In actual implementation, another division manner may be used.

Figure 19:
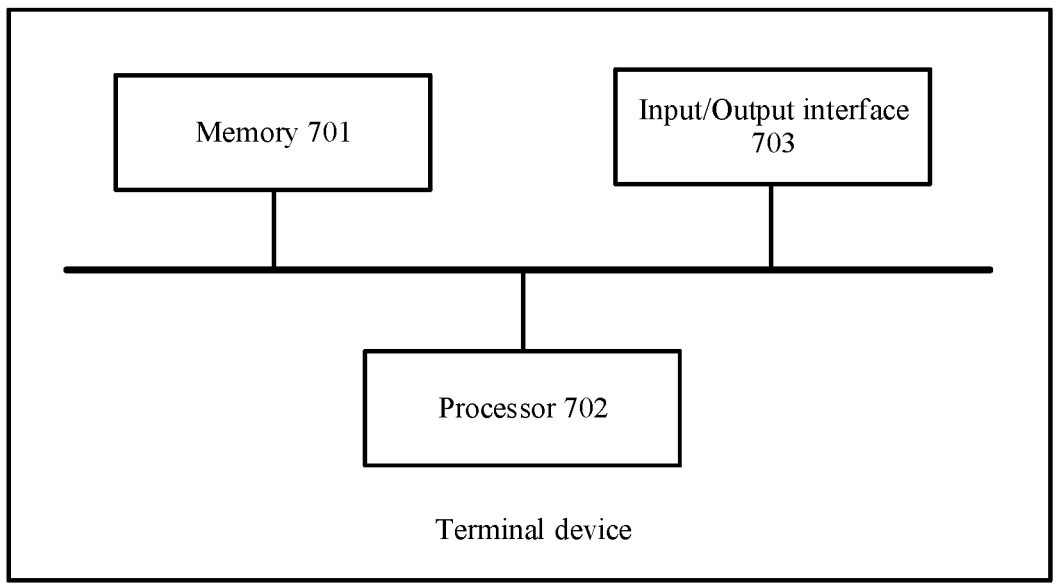
FIG. 19 is a schematic structural diagram of another terminal device according to this application.

FIG. 19 is a schematic structural diagram of another terminal device according to this application. The terminal device 700 includes:

a memory 701, configured to store a program instruction, where the memory 701 may be a flash (flash memory); and a processor 702, configured to invoke and execute the program instruction in the memory, to implement the steps in the data transmission method in any one of FIG. 2 to FIG. 4 or FIG. 6. For details, refer to the related descriptions in the foregoing method embodiments.

The terminal device 700 may further include an input/output interface 703. The input/output interface 703 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The terminal device may be configured to perform the steps and/or procedures corresponding to the terminal device in the foregoing method embodiments.

Figure 20:
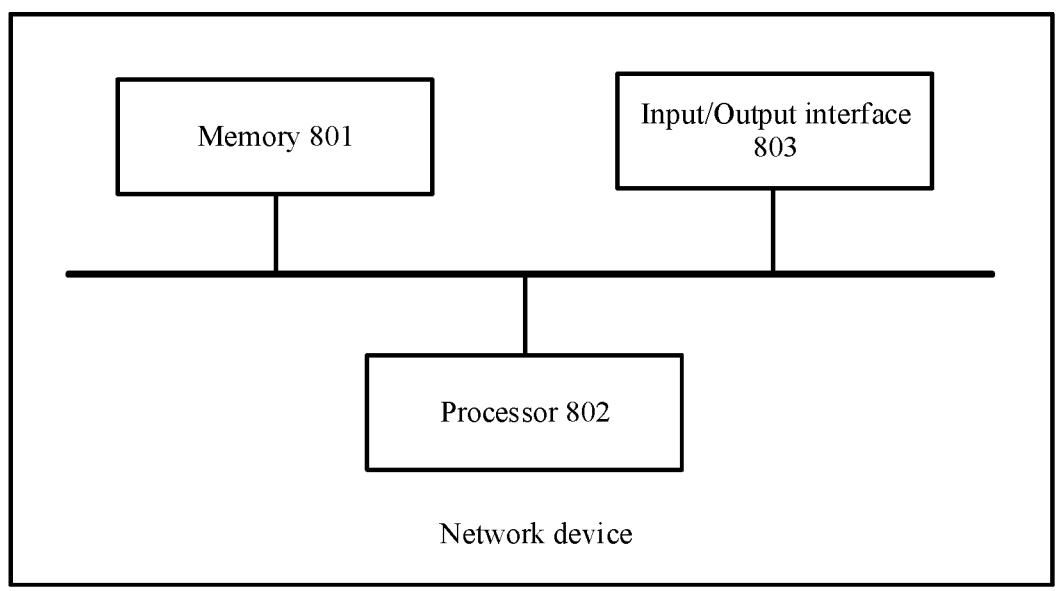
FIG. 20 is a schematic structural diagram of another network device according to this application.

FIG. 20 is a schematic structural diagram of another network device according to this application. The network device 800 includes:

a memory 801, configured to store a program instruction, where the memory 801 may be a flash (flash memory); and a processor 802, configured to invoke and execute the program instruction in the memory, to implement the steps in the data transmission method in any one of FIG. 2 to FIG. 4 or FIG. 6. For details, refer to the related descriptions in the foregoing method embodiments.

The network device 800 may further include an input/output interface 803. The input/output interface 803 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The network device may be configured to perform the steps and/or procedures corresponding to the network device in the foregoing method embodiments.

This application further provides a readable storage medium. The readable storage medium stores an execution instruction. When at least one processor of a terminal device executes the execution instruction, the terminal device performs the data transmission method in the foregoing method embodiments.

This application further provides a program product. The program product includes an execution instruction, and the execution instruction is stored in a readable storage medium. At least one processor of a terminal device can read the execution instruction from the readable storage medium, and the at least one processor executes the execution instruction, so that the terminal device implements the data transmission method in the foregoing method embodiments.

A person of ordinary skill in the art may understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive Solid State Disk (SSD)), or the like.

What is claimed is:

1. A data transmission method, comprising:
   receiving first downlink control information (DCI) sent by a network device, wherein
      the first DCI includes a quantity of layers for transmitting first data through a physical downlink shared channel (PDSCH), and under a first condition, the quantity of layers of the first data is less than or equal to N1, and under a second condition, the quantity of layers of the first data is less than or equal to N2, N1 is less than N2, N2 is a maximum quantity of layers, for transmitting data through the PDSCH, supported by a terminal device, and N1 is a positive integer,
      the first condition includes any one of: same-slot scheduling, a scheduling latency being less than a preset value, channel quality or a signal-to-noise ratio being less than a preset value, and/or DCI not including scheduling information, and
      the second condition includes any one of: cross-slot scheduling, a scheduling latency being greater than a preset value, channel quality or a signal-to-noise ratio being greater than a preset value, and/or DCI including scheduling information;
   receiving the first data sent by the network device; and
   demodulating the first data based on the first DCI.

2. The method according to claim 1, wherein the first DCI further comprises a slot offset of the first data in time, wherein
   when the quantity of layers of the first data is less than or equal to N1, the slot offset is less than a preset value; and
   when the quantity of layers of the first data is switched from being less than or equal to N1 to being less than or equal to N2, the slot offset is greater than or equal to the preset value.

3. The method according to claim 1, wherein under the second condition, the quantity of layers of the first data is less than or equal to N2, and after the receiving the first data sent by the network device, and demodulating the first data based on the first DCI, the method further comprises:
   starting a timer from a position of the first DCI, wherein
   when second DCI is not received in preset X slots, and the timer expires, a quantity of layers for receiving second data that is sent by the network device through the PDSCH is less than or equal to N1; or
   when second DCI is received in preset X slots, the timer performs re-timing, wherein the second DCI comprises a quantity of layers of third data transmitted through the PDSCH.

4. The method according to claim 3, wherein that when second DCI is received in preset X slots, the timer performs re-timing comprises:
   if a quantity of layers, of the second data, indicated by the second DCI is greater than a first preset quantity of layers, the timer performs re-timing; or
   if a quantity of layers, of the second data, indicated by the second DCI is less than or equal to the first preset quantity of layers, the timer continues to perform timing, and when the timer expires, a quantity of layers for receiving the third data that is sent by the network device through the PDSCH is less than or equal to N1.

5. The method according to claim 1, wherein under the second condition, the quantity of layers of the first data is less than or equal to N2, and after the receiving the first data sent by the network device, and demodulating the first data based on the first DCI,
   when a quantity of times that a quantity of layers of second data is less than a second preset quantity of layers is equal to a preset threshold, a quantity of layers for receiving third data that is sent by the network device through the PDSCH is less than or equal to N1, and the preset threshold is a positive integer.

6. The method according to claim 1, further comprising:
   receiving a channel state information reference signal (CSI-RS) sent by the network device; and
   calculating, based on the CSI-RS, first channel quality information (CQI) under the first condition and second CQI under the second condition, and sending the first CQI and/or the second CQI to the network device.

7. The method according to claim 6, wherein when the first data sent by the network device is received in a time unit in which a CSI-RS resource is located, if a quantity of antenna ports configured in the CSI-RS resource is greater than N1, the quantity of layers of the first data is less than or equal to N2.

8. The method according to claim 1, wherein N1 is equal to a quantity of antennas used by the terminal device to receive DCI sent through a physical downlink control channel (PDCCH).

9. A data transmission method, comprising:
sending first downlink control information (DCI) to a terminal device, wherein
the first DCI includes a quantity of layers for transmitting first data through a physical downlink shared channel (PDSCH), and under a first condition, the quantity of layers of the first data is less than or equal to N1, and under a second condition, the quantity of layers of the first data is less than or equal to N2, N1 is less than N2, N2 is a maximum quantity of layers, for transmitting data through the PDSCH, supported by the terminal device, and N1 is a positive integer,
the first condition includes any one of: same-slot scheduling, a scheduling latency being less than a preset value, channel quality or a signal-to-noise ratio being less than a preset value, and/or DCI not including scheduling information, and
the second condition includes any one of: cross-slot scheduling, a scheduling latency being greater than a preset value, channel quality or a signal-to-noise ratio being greater than a preset value, and/or DCI including scheduling information; and
sending the first data to the terminal device.

10. The method according to claim 9, wherein the first DCI further comprises a slot offset of the first data in time, wherein
when the quantity of layers of the first data is less than or equal to N1, the slot offset is less than a preset value; and
when the quantity of layers of the first data is switched from being less than or equal to N1 to being less than or equal to N2, the slot offset is greater than or equal to the preset value.

11. The method according to claim 9, wherein under the second condition, the quantity of layers of the first data is less than or equal to N2, and after the sending the first data to the terminal device, the method further comprises:
starting a timer from a position of the first DCI, wherein
when second DCI is not sent to the terminal device in preset X slots, and the timer expires, a quantity of layers for sending second data to the terminal device through the PDSCH is less than or equal to N1; or
when second DCI is sent to the terminal device in preset X slots, the timer performs re-timing, wherein the second DCI comprises a quantity of layers of third data transmitted through the PDSCH.

12. The method according to claim 11, wherein that when second DCI is sent to the terminal device in preset X slots, the timer performs re-timing comprises:
if a quantity of layers, of the second data, indicated by the second DCI is greater than a first preset quantity of layers, the timer performs re-timing; or
if a quantity of layers, of the second data, indicated by the second DCI is less than or equal to the first preset quantity of layers, the timer continues to perform timing, and when the timer expires, a quantity of layers for sending the third data to the terminal device through the PDSCH is less than or equal to N1.

13. The method according to claim 9, wherein under the second condition, the quantity of layers of the first data is less than or equal to N2, and after the sending the first data to the terminal device,
when a quantity of times that a quantity of layers of second data is less than a second preset quantity of layers is equal to a preset threshold, a quantity of layers for sending third data to the terminal device through the PDSCH is less than or equal to N1, and the preset threshold is a positive integer.

14. The method according to claim 9, further comprising:
sending a channel state information reference signal (CSI-RS) to the terminal device, so that the terminal device calculates, based on the CSI-RS, first channel quality information (CQI) under the first condition and second CQI under the second condition; and
receiving the first CQI and/or the second CQI sent by the terminal device, wherein
when the first data is sent to the terminal device in a time unit in which a CSI-RS resource is located, if a quantity of antenna ports configured in the CSI-RS resource is greater than N1, the quantity of layers of the first data is less than or equal to N2.

15. A terminal device, comprising:
a processor; and
a memory configured to store computer readable instructions that, when executed by the processor, cause the terminal device to:
receive first downlink control information (DCI) sent by a network device, wherein
the first DCI includes a quantity of layers for transmitting first data through a physical downlink shared channel PDSCH, and under a first condition, the quantity of layers of the first data is less than or equal to N1, and under a second condition, the quantity of layers of the first data is less than or equal to N2, N1 is less than N2, N2 is a maximum quantity of layers, for transmitting data through the PDSCH, supported by the terminal device, and N1 is a positive integer,
the first condition includes any one of: same-slot scheduling, a scheduling latency being less than a preset value, channel quality or a signal-to-noise ratio being less than a preset value, and/or DCI not including scheduling information, and
the second condition includes any one of: cross-slot scheduling, a scheduling latency being greater than a preset value, channel quality or a signal-to-noise ratio being greater than a preset value, and/or DCI including scheduling information;
receive the first data sent by the network device; and
demodulate the first data based on the first DCI.

16. The terminal device according to claim 15, wherein the first DCI further comprises a slot offset of the first data in time, wherein
when the quantity of layers of the first data is less than or equal to N1, the slot offset is less than a preset value; and
when the quantity of layers of the first data is switched from being less than or equal to N1 to being less than or equal to N2, the slot offset is greater than or equal to the preset value.

17. The terminal device according to claim 15, wherein under the second condition, the method further comprises:

starting a timer from a position of the first DCI after receiving the first data sent by the network device and demodulating the first data based on the first DCI, wherein when second DCI is not received in preset X slots, and the timer expires, a quantity of layers for receiving second data that is sent by the network device through the PDSCH is less than or equal to N1; or when second DCI is received in preset X slots, the timer performs re-timing, wherein the second DCI comprises a quantity of layers of third data transmitted through the PDSCH.

18. The terminal device according to claim 17, wherein if a quantity of layers, of the second data, indicated by the second DCI is greater than a first preset quantity of layers, the timer performs re-timing; or if a quantity of layers, of the second data, indicated by the second DCI is less than or equal to the first preset quantity of layers, the timer continues to perform timing, and when the timer expires, a quantity of layers of the third data that is sent by the network device through the PDSCH is less than or equal to N1.

19. The terminal device according to claim 15, further comprising:

receiving a channel state information reference signal CSI-RS sent by the network device; and calculating based on the CSI-RS, first channel quality information CQI under the first condition and second CQI under the second condition, and send the first CQI and/or the second CQI to the network device, wherein when the first data sent by the network device is received in a time unit in which a CSI-RS resource is located, if a quantity of antenna ports configured in the CSI-RS resource is greater than N1, the quantity of layers of the first data is less than or equal to N2.

* * * * *